United States Patent
Okada et al.

(10) Patent No.: US 10,201,873 B2
(45) Date of Patent: Feb. 12, 2019

(54) FRICTION STIR SPOT WELDING DEVICE AND FRICTION STIR SPOT WELDING METHOD

(71) Applicant: KAWASAKI JUKOGYO KABUSHIKI KAISHA, Kobe-shi, Hyogo (JP)

(72) Inventors: Hideki Okada, Kakamigahara (JP); Shintaro Fukada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/521,388

(22) PCT Filed: Oct. 22, 2015

(86) PCT No.: PCT/JP2015/005320
§ 371 (c)(1),
(2) Date: Apr. 24, 2017

(87) PCT Pub. No.: WO2016/063538
PCT Pub. Date: Apr. 28, 2016

(65) Prior Publication Data
US 2017/0304935 A1    Oct. 26, 2017

(30) Foreign Application Priority Data
Oct. 23, 2014 (JP) ................. 2014-216642

(51) Int. Cl.
*B23K 20/12* (2006.01)
(52) U.S. Cl.
CPC .......... *B23K 20/1265* (2013.01); *B23K 20/12* (2013.01); *B23K 20/123* (2013.01); *B23K 20/1255* (2013.01)

(58) Field of Classification Search
CPC .................... B23K 20/122–20/128
(Continued)

(56) References Cited

U.S. PATENT DOCUMENTS 7,581,665 B2 * 9/2009 Burton ............... B23K 20/1255
228/112.1
7,654,435 B2 * 2/2010 Kumagai ............. B23K 20/125
228/112.1
(Continued)

FOREIGN PATENT DOCUMENTS

EP   2687315 A1 * 1/2014 ......... B23K 20/1245
JP   2012-196682 A   10/2012

OTHER PUBLICATIONS

Jan. 26, 2016 International Search Report issued with International Patent Application No. PCT/JP2015/005320.

*Primary Examiner* — Kiley S Stoner
(74) *Attorney, Agent, or Firm* — Oliff PLC

(57) ABSTRACT

A friction stir spot welding device includes a pin member, a shoulder member, a rotation driving unit, a tool driving unit, a position detector, and a controller, wherein the controller sets as reference position of the tip end surface of the pin member or shoulder member at a time point when the pin member tip end surface or shoulder member contacts an obverse surface of an object and controls the tool driving unit reducing a pressing force to the object by the pin member and pressing force to the object by the shoulder member in a next welding process, and/ or controls the rotation driving unit reducing the pin member rotational speed and shoulder member rotational speed in the next welding process, in case where a first position is the position of the tip end surface of the pin member or the shoulder member is within a first region.

20 Claims, 19 Drawing Sheets

(58) Field of Classification Search
USPC .............................................. 228/112.1, 2.1
See application file for complete search history.

(56) References Cited

U.S. PATENT DOCUMENTS

| | | | | |
|---|---|---|---|---|
| 7,681,773 | B2* | 3/2010 | Burton | B23K 20/1255 |
| | | | | 228/112.1 |
| 8,950,650 | B2* | 2/2015 | Okada | B23K 20/1245 |
| | | | | 228/102 |
| 9,095,926 | B2* | 8/2015 | Okada | B23K 20/1265 |
| 9,302,343 | B2* | 4/2016 | Kumagai | B23K 20/1265 |
| 9,314,870 | B2* | 4/2016 | Okada | B23K 20/1265 |
| 2007/0152015 | A1* | 7/2007 | Burton | B23K 20/1255 |
| | | | | 228/2.1 |
| 2008/0006677 | A1* | 1/2008 | Kumagai | B23K 20/125 |
| | | | | 228/101 |
| 2008/0029581 | A1* | 2/2008 | Kumagai | B23K 20/1255 |
| | | | | 228/101 |
| 2009/0236045 | A1* | 9/2009 | Burton | B23K 20/1255 |
| | | | | 156/349 |
| 2014/0069985 | A1* | 3/2014 | Okada | B23K 20/1245 |
| | | | | 228/112.1 |
| 2014/0069986 | A1* | 3/2014 | Okada | B23K 20/1265 |
| | | | | 228/112.1 |
| 2015/0183053 | A1* | 7/2015 | Kumagai | B23K 20/126 |
| | | | | 228/112.1 |
| 2015/0183054 | A1* | 7/2015 | Okada | B23K 20/1245 |
| | | | | 228/2.1 |
| 2015/0231734 | A1* | 8/2015 | Okada | B23K 20/123 |
| | | | | 228/2.1 |

\* cited by examiner

FRICTION STIR SPOT WELDING DEVICE AND FRICTION STIR SPOT WELDING METHOD

TECHNICAL FIELD

The present invention relates to a friction stir spot welding device and a friction stir spot welding method.

BACKGROUND ART

In transportation vehicles such as automobiles, railway vehicles, and aircraft, a resistance spot welding or riveted joint is used to join metal materials together. In recent years, an attention has been paid to a method of welding (joining) the metal materials by utilizing friction heat (friction stir spot welding (joining) method) (see e.g., Patent Literature 1).

CITATION LIST

Patent Literature

Patent Literature 1: Japanese Laid-Open Patent Application Publication No. 2012-196682

SUMMARY OF INVENTION

Technical Problem

In a case where the state of a welding tool (including a backing member) is significantly changed while a friction stir spot welding device is welding an object to be welded, in particular, in a case where serial spots welding for the object is performed, the external appearance of the object is impaired. The present inventors intensively studied this problem, and found the following phenomenon. Heat is accumulated in the welding tool (including the backing member), the material is softened by heat transferred from the welding tool and moves to a region that is outward of a clamp member, the material present below the clamp member is plasticized, a welded region and the clamp member are depressed, or the clamp member is raised, compared to a case where single spot welding for the object is performed.

The present invention has been developed to solve the above-described problem, and an object of the present invention is to provide a friction stir spot welding device and a friction stir spot welding method, which can realize a good welding quality even in a case where serial spots friction stir welding is performed, in particular, in a double-acting friction stir spot welding method.

Solution to Problem

To solve the above-described problem, according to the present invention, there is provided a friction stir spot welding device which welds an object to be welded, by softening the object by friction heat and by stirring the object, the friction stir spot welding device comprising: a pin member which has a solid cylinder shape, is rotatable around an axis of the pin member, and is advanceable and retractable along the axis of the pin member; a shoulder member which has a tubular shape with a circular cross-section, is rotatable around an axis of the shoulder member, and is advanceable and retractable along the axis of shoulder member, the pin member being insertable into the shoulder member; a rotation driving unit which rotates the pin member around the axis of the pin member and rotates the shoulder member around the axis of the shoulder member; a tool driving unit which causes the pin member to be advanced and retracted along the axis of the pin member, and causes the shoulder member to be advanced and retracted along the axis of the shoulder member; a position detector which detects an axial position of a tip end surface of the pin member or an axial position of a tip end surface of the shoulder member; and a controller which sets as a reference position the axial position of the tip end surface of the pin member or the axial position of the tip end surface of the shoulder member which is detected by the position detector at a time point when the tip end surface of the pin member or the tip end surface of the shoulder member contacts an obverse surface of the object, when a welding process for the object is initiated, and controls the tool driving unit to make the tip end surface of the pin member and the tip end surface of the shoulder member coplanar with each other, when the welding process for the object ends, controls the tool driving unit to reduce a pressing force applied to the object by the pin member and a pressing force applied to the object by the shoulder member in a next welding process, and/or controls the rotation driving unit to reduce a rotational speed of the pin member and a rotational speed of the shoulder member in the next welding process, in a case where a first position which is the axial position of the tip end surface of the pin member or the axial position of the tip end surface of the shoulder member, which is detected by the position detector, is within a first region which is inward of the object relative to the reference position, when the welding process for the object ends.

In this configuration, a good welding quality can be realized even when the serial spots welding is performed.

According to the present invention, there is provided a friction stir spot welding method which welds an object to be welded, by softening the object by friction heat and by stirring the object, the friction stir spot welding method comprising: (A) setting as a reference position an axial position of a tip end surface of a pin member or an axial position of a tip end surface of a shoulder member which is detected by a position detector at a time point when the tip end surface of the pin member or the tip end surface of the shoulder member contacts an obverse surface of the object, wherein the pin member has a solid cylinder shape, is rotatable around an axis of the pin member, and is advanceable and retractable along the axis of the pin member, and the shoulder member is disposed to surround an outer peripheral surface of the pin member, has a tubular shape with a circular cross-section, is rotatable around an axis of the shoulder member, and is advanceable and retractable along the axis of the shoulder member; (B) causing a tool driving unit to advance and retract the pin member or the shoulder member along the axis of the pin member or the axis of the shoulder member, in a state in which the object is pressed by a preset pressing force applied by the pin member or the shoulder member, and causing a rotation driving unit to rotate the pin member or the shoulder member at a preset rotational speed, to partially stir the object and weld the object; (C) driving the tool driving unit to make the tip end surface of the pin member and the tip end surface of the shoulder member coplanar with each other, when the welding process for the object ends, (D) detecting a first position by the position detector, the first position being an axial position of the tip end surface of the pin member or an axial position of the tip end surface of the shoulder member, after (C); and (E) changing setting to reduce a pressing force applied to the object by the pin member and a pressing force applied to the object by the shoulder member in a next welding process, and/or to reduce a rotational speed of the pin member and a rotational speed of the shoulder member in the next welding process, in a case where the first position is within a first region that is inward of the object relative to the reference position.

In this method, a good welding quality can be realized even when the serial spots welding is performed.

The above and further objects, features and advantages of the present invention will more fully be apparent from the following detailed description of preferred embodiments with reference to accompanying drawings.

Advantageous Effects of Invention

In accordance with a friction stir spot welding device and a friction stir spot welding method of the present invention, a good welding quality can be realized even when the serial spots welding is performed.

DESCRIPTION OF EMBODIMENTS

Figure 1:
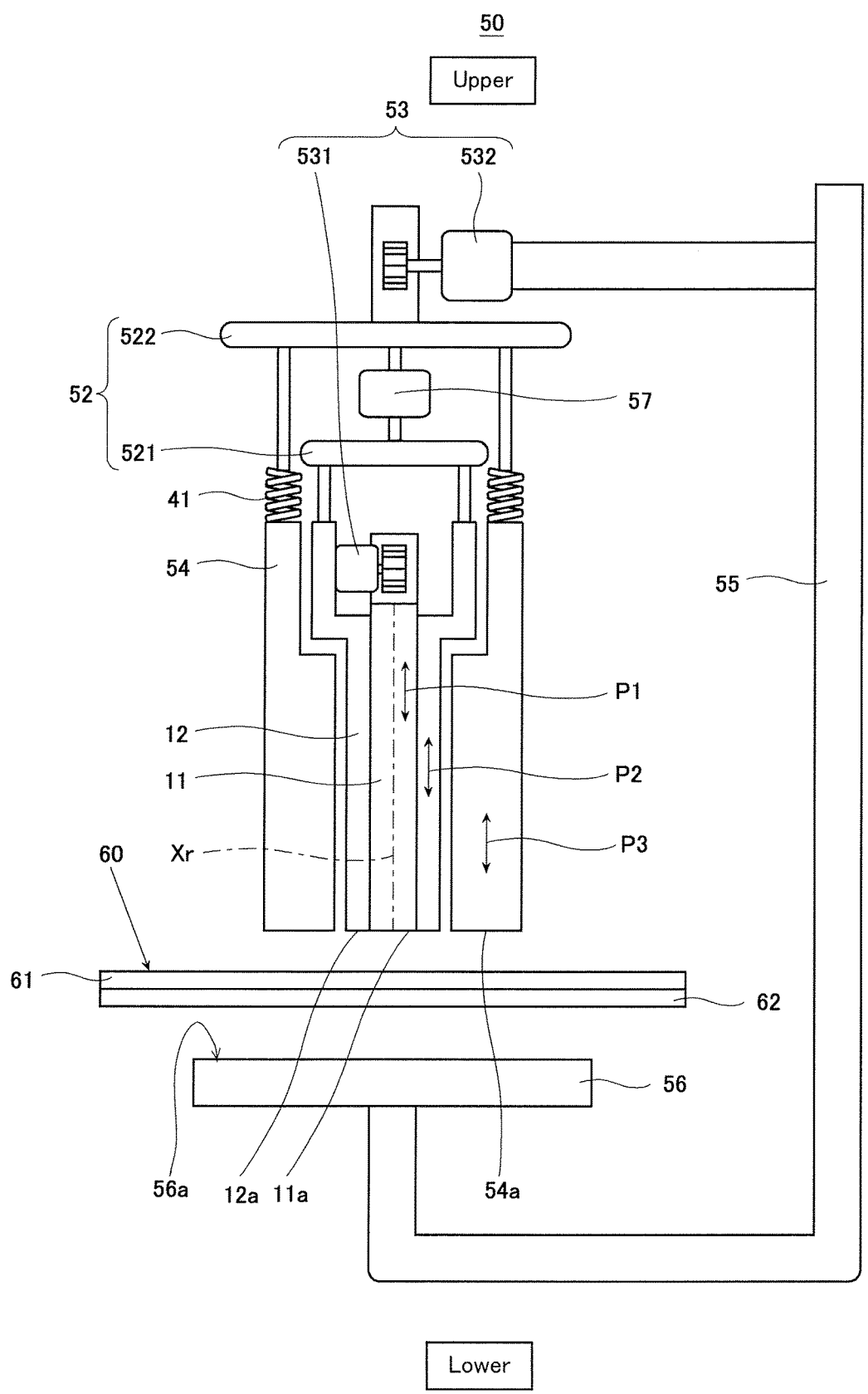
FIG. 1 is a schematic view showing the configuration of a friction stir spot welding device according to Embodiment 1.

Hereinafter, the preferred embodiments of the present invention will be described with reference to the drawings. Throughout the drawings, the same or corresponding constituents are designated by the same reference symbols and will not be described in repetition. Also, throughout the drawings, constituents required to explain the present invention are extracted and the other constituents are not shown in some cases. Further, the present invention is not limited by the embodiments described below.

(Embodiment 1)

A friction stir spot welding device according to Embodiment 1, which welds an object to be welded, by softening the object by friction heat and by stirring the object, comprises: a pin member which has a solid cylinder shape, is rotatable around an axis of the pin member, and is advanceable and retractable along the axis of the pin member; a shoulder member which has a tubular shape with a circular cross-ssection, is rotatable around an axis of the shoulder member, and is advanceable and retractable along the axis of shoulder member, the pin member being insertable into the shoulder member; a rotation driving unit which rotates the pin member around the axis of the pin member and rotates the shoulder member around the axis of the shoulder member: a tool driving unit which causes the pin member to be advanced and retracted along the axis of the pin member, and causes the shoulder member to be advanced and retracted along the axis of the shoulder member; a position detector which detects an axial position of a tip end surface of the pin member or an axial position of a tip end surface of the shoulder member; and a controller which sets as a reference position the axial position of the tip end surface of the pin member or the axial position of the tip end surface of the shoulder member which is detected by the position detector at a time point when the tip end surface of the pin member or the tip end surface of the shoulder member contacts an obverse surface of the object, when a welding process for the object is initiated, and controls the tool driving unit to make the tip end surface of the pin member and the tip end surface of the shoulder member coplanar with each other, when the welding process for the object ends, controls the tool driving unit to reduce a pressing force applied to the object by the pin member and a pressing force applied to the object by the shoulder member in a next welding process, and/or controls the rotation driving unit to reduce a rotational speed of the pin member and a rotational speed of the shoulder member in the next welding process, in a case where a first position which is the axial position of the tip end surface of the pin member or the axial position of the tip end surface of the shoulder member, which is detected by the position detector, is within a first region which is inward of the object relative to the reference position, when the welding process for the object ends.

Now, an example of the friction stir spot welding device according to Embodiment 1 will be described in detail with reference to the drawings.

[Configuration of Friction Stir Spot Welding Device]

FIG. 1 is a schematic view showing the configuration of a friction stir spot welding device according to Embodiment 1. In FIG. 1, an upper side and a lower side in FIG. 1 show upper side and a lower side of the friction stir spot welding device.

As shown in FIG. 1, a friction stir spot welding device 50 according to Embodiment 1 includes a pin member 11, a shoulder member 12, a tool fixing unit 52, a tool driving unit 53, a clamp member 54, a backing support section 55, a backing member 56, and a rotation driving unit 57.

The pin member 11 and the shoulder member 12 are supported by the tool fixing unit 52, and are vertically advanced and retracted by the tool driving unit 53. The pin member 11, the shoulder member 12, the tool fixing unit 52, the tool driving unit 53, and the clamp member 54 are disposed at the upper portion of the backing support section 55 configured by a C-type gun (C-type frame). The backing member 56 is provided at the lower portion of the backing support section 55. The pin member 11, the shoulder member 12, and the backing member 56 are mounted on the backing support section 55 in such a manner that the pin member 11 and the shoulder member 12 face the backing member 56. Between the pin member 11 and the shoulder member 12, and the backing member 56, an object to be welded (materials to be welded) is disposed.

The tool fixing unit 52 includes a rotating tool fixing unit 521 and a clamp fixing unit 522. The tool driving unit 53 includes a pin driving unit 531, a shoulder driving unit 532, and a clamp driving unit 41. The clamp member 54 is fastened to the clamp fixing unit 522 via the clamp driving unit 41. The clamp driving unit 41 is constituted by a spring.

The pin member 11 has a substantially solid cylinder shape or a substantially tubular shape with a circular cross-section. The pin member 11 is supported by the rotating tool fixing unit 521, although not shown in detail in FIG. 1. The rotation driving unit 57 causes the pin member 11 to be rotatable around an axis Xr (rotational axis) conforming to the center axis of the pin member 11. The pin driving unit 531 causes the pin member 11 to be advanceable and retractable along an arrow P1 direction, namely the axis Xr direction (in a vertical direction in FIG. 1).

The shoulder member 12 has a tubular shape with a circular cross-section and has a hollow space. The shoulder member 12 is supported by the rotating tool fixing unit 521. The pin member 11 is inserted into the hollow space of the shoulder member 12. In other words, the shoulder member 12 is disposed to surround the outer peripheral surface of the pin member 11. The rotation driving unit 57 causes the shoulder member 12 to be rotatable around the axis Xr as in the pin member 11, and the shoulder driving unit 532 causes the shoulder member 12 to be advanceable and retractable along an arrow P2 direction, namely the axis Xr direction.

As described above, in the present embodiment, the pin member 11 and the shoulder member 12 are supported by the rotating tool fixing unit 521. The rotation driving unit 57 causes the pin member 11 and the shoulder member 12 to be rotatable together around the axis Xr. The pin driving unit 531 causes the pin member 11 to be advanceable and retractable along the axis Xr direction, and the shoulder driving unit 532 causes the shoulder member 12 to be advanceable and retractable along the axis Xr direction. In Embodiment 1, the pin member 11 is advanceable and retractable by itself, and advanceable and retractable according to the advancing and retracting motions of the shoulder member 12. Alternatively, each of the pin member 11 and the shoulder member 12 may be independently advanceable and retractable.

As in the shoulder member 12, the clamp member 54 has a tubular shape with a circular cross-section and with a hollow space, and is disposed in such a manner that its center axis conforms to the axis Xr. The shoulder member 12 is inserted into the hollow space of the clamp member 54.

More specifically, the shoulder member 12 with a substantially tubular shape with a circular cross-section is disposed to surround the outer peripheral surface of the pin member 11, and the clamp member 54 with a substantially tubular shape with a circular cross-section is disposed to surround the outer peripheral surface of the shoulder member 12. In other words, the clamp member 54, the shoulder member 12, and the pin member 11 has a concentrically nested structure.

The clamp member 54 is configured to press (push) an object 60 to be welded from a first surface (obverse surface). As described above, in Embodiment 1, the clamp member 54 is supported on the clamp fixing unit 522 via the clamp driving unit 41. The clamp driving unit 41 is configured to bias the clamp member 54 toward the backing member 56.

Although the clamp driving unit 41 is constituted by the spring in Embodiment 1, this is merely exemplary. It is sufficient that the clamp driving unit 41 applies a biasing force or a welding pressure to the clamp member 54. For example, a mechanism using a gas pressure, a hydraulic pressure, a servo motor, or the like, may be used as the clamp driving unit 41.

The rotating tool fixing unit 521 is supported on the clamp fixing unit 522 via the rotation driving unit 57. The shoulder driving unit 532 causes the clamp member 54 (including the clamp driving unit 41 and the clamp fixing unit 522) to be advanceable and retractable in arrow P3 direction (arrow P1 direction and arrow P2 direction).

In summary, in Embodiment 1, the clamp driving unit 41 and the shoulder driving unit 532 constitute a clamp member driving unit. The clamp member driving unit may be constituted by a driving unit which causes the clamp member 54 to be advanceable and retractable independently of the shoulder driving unit 532.

The pin member 11, the shoulder member 12, and the clamp member 54 have a tip end surface 11a, a tip end surface 12a, and a tip end surface 54a, respectively. The pin member 11, the shoulder member 12, and the clamp member 54 are driven (actuated) to be advanced and retracted by the tool driving unit 53 and thereby the tip end surface 11a, the tip end surface 12a, and the tip end surface 54a contact the obverse surface of the object 60.

In Embodiment 1, the backing member 56 supports the object 60 in such a manner that a flat surface (support surface 56a) contacts the reverse surface of the flat object 60. The configuration of the backing member 56 is not particularly limited so long as it is capable of properly supporting the object 60 while the friction stir spot welding is performed. As the backing member 56, for example, plural kinds of backing members 56 are prepared in advance. Depending on the kind of the object 60, the backing member 56 is detached from the backing support section 55 and replaced by another backing member.

The configurations of the pin member 11, the shoulder member 12, the tool fixing unit 52, the tool driving unit 53, the clamp member 54, the backing support section 55, and the rotation driving unit 57 in Embodiment 1 are not limited to the above-described configurations. Configurations which are known in the art of the friction stir spot welding are suitably used. For example, although each of the pin driving unit 531 and the shoulder driving unit 532 included in the tool driving unit 53 includes the motor, the gear mechanism or the like known in the art of the friction stir spot welding, this is merely exemplary.

Although in Embodiment 1, the clamp member 54 is provided, this is merely exemplary and the clamp member 54 may be omitted. In this case, for example, the clamp member 54 may be detachable from the backing support section 55 as required.

Although in Embodiment 1, the backing support section 55 is the C-type gun, this is merely exemplary. The backing support section 55 may be configured in any way so long as the backing support section 55 can support the pin member 11 and the shoulder member 12 in such a manner that the pin member 11 and the shoulder member 12 are advanceable and retractable, and can support the backing member 56 at a location at which the backing member 56 faces the pin member 11 and the shoulder member 12.

Further, the friction stir spot welding device 50 according to Embodiment 1 is used with a robot device (not shown) for friction stir spot welding. Specifically, the backing support section 55 is attached on the tip end of an arm of the robot device. Therefore, the backing support section 55 can be recognized as being included in the robot device for friction stir spot welding. The specific configuration of the robot device for friction stir spot welding, including the backing support section 55 and the robot arm is not particularly limited. A configuration which is known in the art of the friction stir spot welding such as a multi joint robot may be used.

The friction stir spot welding device 50 (including the backing support section 55) may be suitably applied to, for example, known treatment devices such as a NC machine tool, a huge C-frame, and an automatic riveting machine, as well as the robot device for friction stir spot welding.

The friction stir spot welding device 50 according to Embodiment 1 may be configured in such a manner that two or more robots cause the constituents of the friction stir spot welding device 50 which are other than the backing member 56 face the backing member 56. Further, the friction stir spot welding device 50 may hold the object 60 with the hand so long as the friction stir spot welding device 50 can stably perform the friction stir spot welding for the object 60. Or, the robot may be used as a positioner for the object 60.

[Control Configuration of Friction Stir Spot Welding Device]

Next, the control configuration of the friction stir spot welding device 50 according to Embodiment 1 will be specifically described with reference to FIG. 2.

Figure 2:
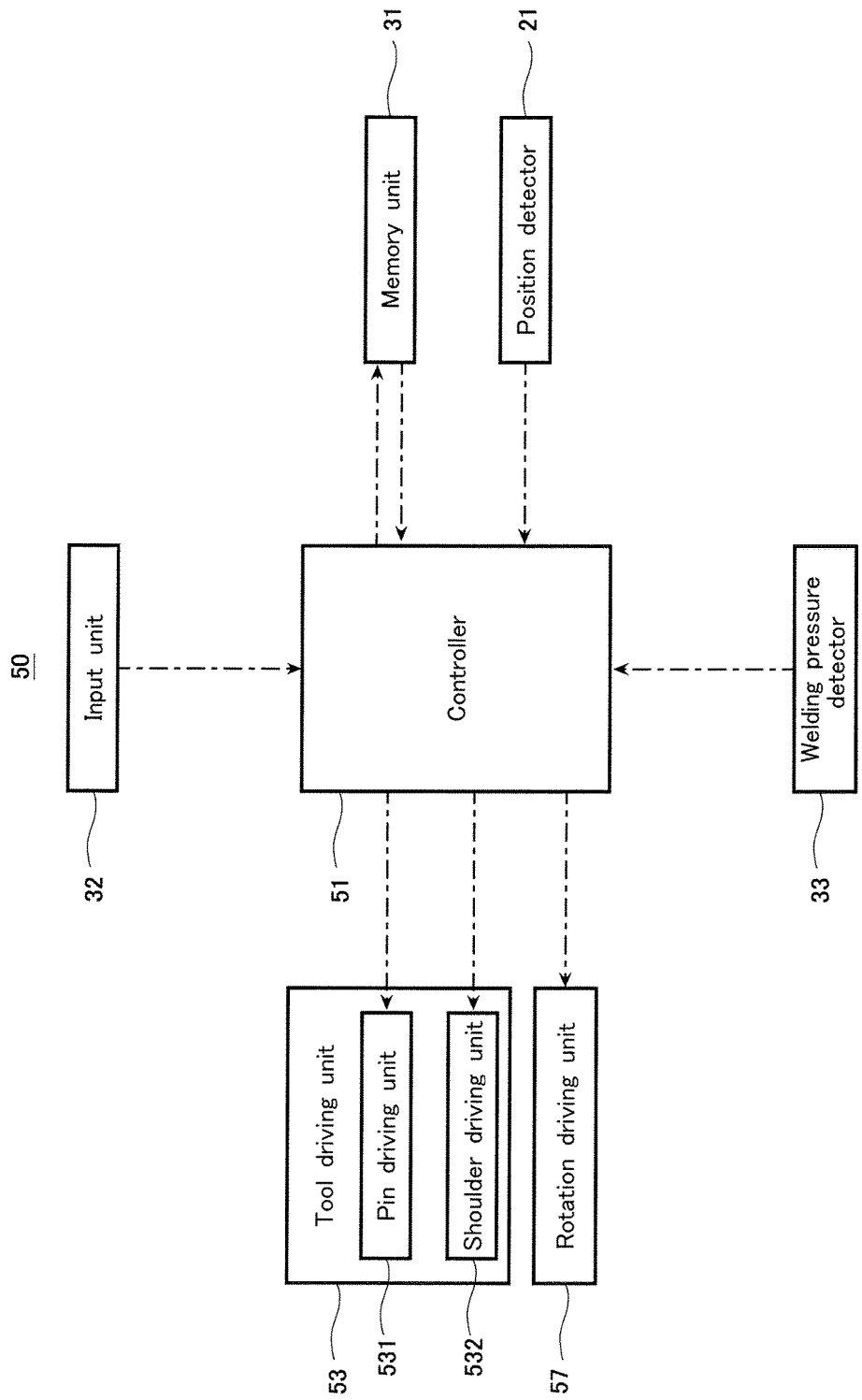
FIG. 2 is a schematic block diagram showing a control configuration for the friction stir spot welding device of FIG. 1.

FIG. 2 is a schematic block diagram showing a control configuration for the friction stir spot welding device of FIG. 1.

As shown in FIG. 2, the friction stir spot welding device 50 includes a controller 51, a position detector 21, a memory unit 31, an input unit 32, and a welding pressure detector 33.

The memory unit 31 is configured to store therein data so that the data can be read therefrom. As the memory unit 31, a memory device such as a known memory and a hard disc is used. The memory unit 31 is not necessarily a single memory unit and may be comprised of a plurality of memories (e.g., a random access memory and a hard disc drive). In a case where the controller 51 or the like is configured as a microcomputer, at least a portion of the memory unit 31 may be configured as an internal memory of the microcomputer or an independent memory.

Not to mention, data is stored in the memory unit 31 and can be read by the constituent other than the controller 51, or the controller 51 or the like can write the data to the memory unit 31. The memory unit 31 contains therein a reference position (0 point) which is a position at which the tip end surface 11a of the pin member 11 or the tip end surface 12a of the shoulder member 12 contacts the obverse surface of the object 60.

The input unit 32 is operated to input to the controller 51 parameters relating to a control for the friction stir spot welding or other data and is configured as a known input device such as a key board, a touch panel, a button switch, or the like. In Embodiment 1, at least data of welding conditions of the object 60, for example, the thickness of the object 60 and quality of the material of the object 60 can be input by use of the input unit 32.

The position detector 21 is configured to detect the position in the axis Xr direction (hereinafter simply referred to as the position), of the tip end surface 11a of the pin member 11 or the tip end surface 12a of the shoulder member 12, and output the detected position to the controller 51. As the position detector 21, known position sensors can be used. For example, LVDT, an encoder, or the like may be used.

Although in Embodiment 1, the position detector 21 directly detects the position of the tip end surface 11a of the pin member 11 or the position of the tip end surface 12a of the shoulder member 12, the position detector 21 may indirectly detect the position of the tip end surface 11a of the pin member 11 or the position of the tip end surface 12a of the shoulder member 12. For example, the position detector 21 may be configured to detect a predetermined position of the pin member 11 or the shoulder member 12, and a distance between the predetermined position and the tip end surface may be pre-stored in the controller 51.

As will be described later, in some cases, during the welding of the object 60, heat is accumulated in the pin member 11 and the shoulder member 12, and the pin member 11 and the shoulder member 12 are thermally expanded and deflected. In such cases, the controller 51 compensates the position detected by the position detector 21 by a deflection amount of the pin member 11 or the shoulder member 12, and decide the compensated position as the position of the tip end surface 11a of the pin member 11 or the position of the tip end surface 12a of the shoulder member 12.

The welding pressure detector 33 is configured to detect a welding pressure (pressing force) applied to the object 60 by at least one of the pin member 11, the shoulder member 12, and the clamp member 54, while at least one of the pin member 11, the shoulder member 12, and the clamp member 54 is in contact with or is pressed into the object 60, and output the detected pressing force to the controller 51. In the present embodiment, a load cell is used as the welding pressure detector 33. However, this is merely exemplary, and a known welding pressure detector may be used.

The controller 51 is configured to control the members (units) included in the friction stir spot welding device 50. Specifically, the controller 51 controls the pin driving unit 531 and the shoulder driving unit 532 included in the tool driving unit 53, and the rotation driving unit 57. Thus, it becomes possible to control shifting between an advancing motion and a retracting motion of each of the pin member 11 and the shoulder member 12, and the tip end position, moving speed, a moving direction and the like of each of the pin member 11 and the shoulder member 12 during the advancing motion and the retracting motion. In addition, it becomes possible to control the pressing force applied to the object 60 by the pin member 11, the shoulder member 12, and the clamp member 54. Further, it becomes possible to control the rotational speed of each of the pin member 11 and the shoulder member 12.

The specific configuration of the controller 51 is not particularly limited. In Embodiment 1, the controller 51 is constituted by a microcomputer and includes CPU. The controller 51 is configured to perform computations relating to the operation of the tool driving unit 53 and the operation of the rotation driving unit 57 in such a manner that the CPU reads specified control programs stored in the memory unit 31 and executes the control programs. Note that the controller 51 may be a single controller, or a controller group including a plurality of controllers which performs a cooperative control for the friction stir spot welding device 50.

When the welding process for the object 60 is initiated, the controller 51 sets as a reference position (0 point) a position at which the tip end surface 11a of the pin member 11 or the tip end surface 12a of the shoulder member 12 contacts the obverse surface of the object 60, based on position data detected by the position detector 21 and a welding pressure value detected by the welding pressure detector 33.

More specifically, the controller 51 sets as the reference position the position of the tip end surface 11a of the pin member 11 or the position of the tip end surface 12a of the shoulder member 12, at a time point when the welding pressure detector 33 detects a preset pressing force (welding pressure). As will be described later, the pin member 11, the shoulder member 12, and the clamp member 54 are controlled to contact an obverse surface 60c of the object 60 at the same time (almost at the same time) and press the object 60 with the preset pressing force (see (1) of FIG. 3A). Therefore, the controller 51 can set as the reference position the position of the tip end surface 11a of the pin member 11 or the position of the tip end surface 12a of the shoulder member 12, at a time point when the welding pressure detector 33 detects the preset pressing force.

Figure 3A:
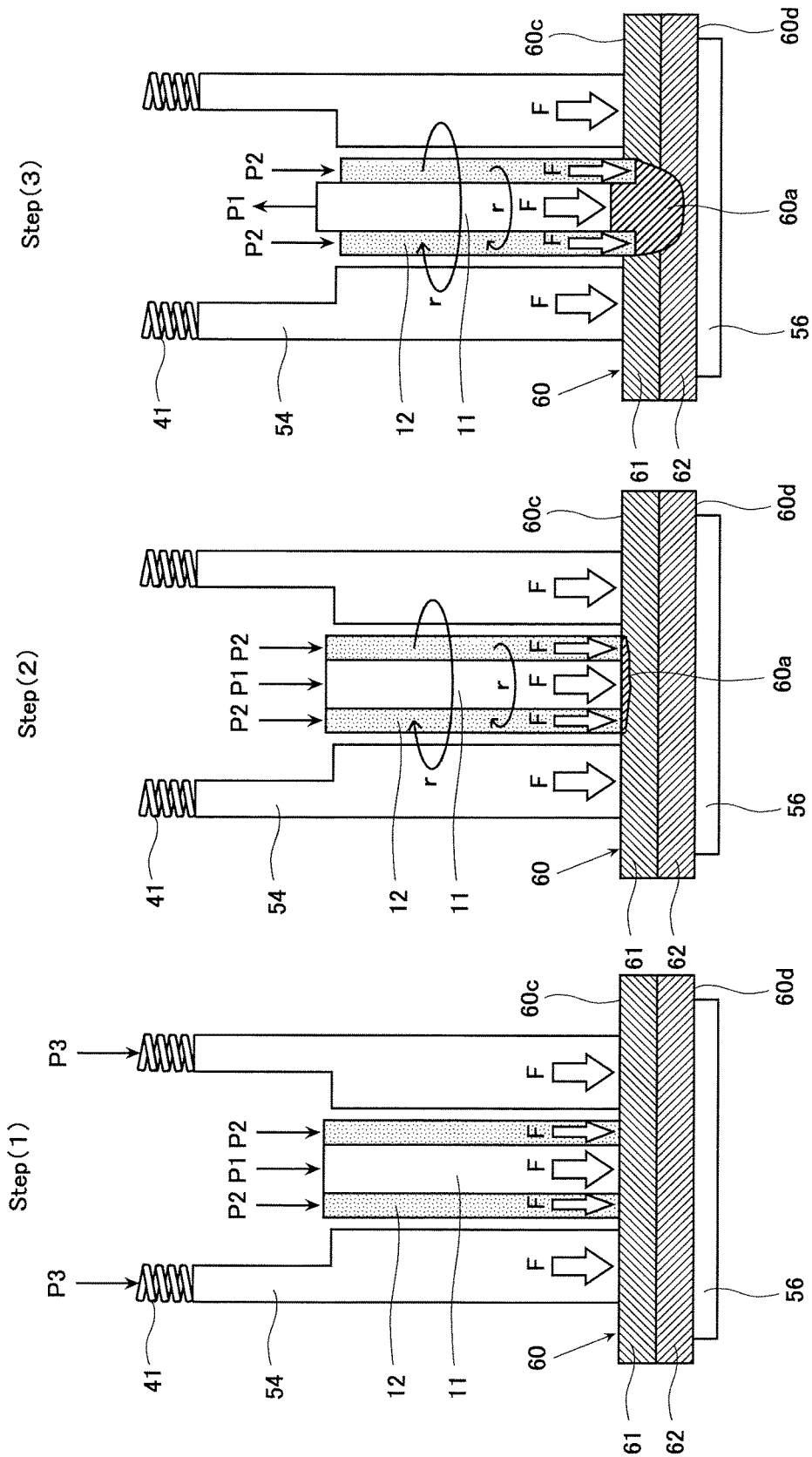
FIG. 3A is a schematic view showing an example of steps of friction stir spot welding performed by the friction stir spot welding device of FIG. 1.

After the pin member 11 or the shoulder member 12 has contacted the object 60, the pin member 11 or the shoulder member 12 is rotated (see (2) of FIG. 3A). The pin member 11 or the shoulder member 12 stays for a specified time on the obverse surface 60c of the object 60 for a time period that passes until the material is softened. In view of this, the controller 51 can set as the reference position the position of the pin member 11 or the shoulder member 12 at a time point when the position data output from the position detector 21 continues to be an equal value for a specified time.

As will be described later, the controller 51 controls the tool driving unit 53 according to a relation formula between the cross-sectional area of the tip end surface of each of the pin member 11 and the shoulder member 12 and a plunge depth of each of the pin member 11 and the shoulder member 12, to control the position of the tip end of each of the pin member 11 and the shoulder member 12.

[Friction Stir Spot Welding Method (Operation of Friction Stir Spot Welding Device]

Next, specific steps of the friction stir spot welding method performed by the friction stir spot welding device 50 will be specifically described with reference to FIGS. 3A, 3B and 4. In the example shown in FIGS. 3A, 3B and 4, two metal plates 61, 62 are used as the object 60 superposed and joined to each other by a spot welding.

In Embodiment 1, the controller 51 controls the tool driving unit 53 so that the absolute value of a tool average position Tx defined in a formula (1) is reduced, in a case where the cross-sectional area of the tip end surface of the pin member 11 is designated by Ap, the cross-sectional area of the tip end surface of the shoulder member 12 is designated by As, the plunge depth of the pin member 11 is designated by Pp, and the plunge depth of the shoulder member 12 is designated by Ps, $$Ap \cdot Pp + As \cdot Ps = Tx \quad (1)$$

Figure 3B:
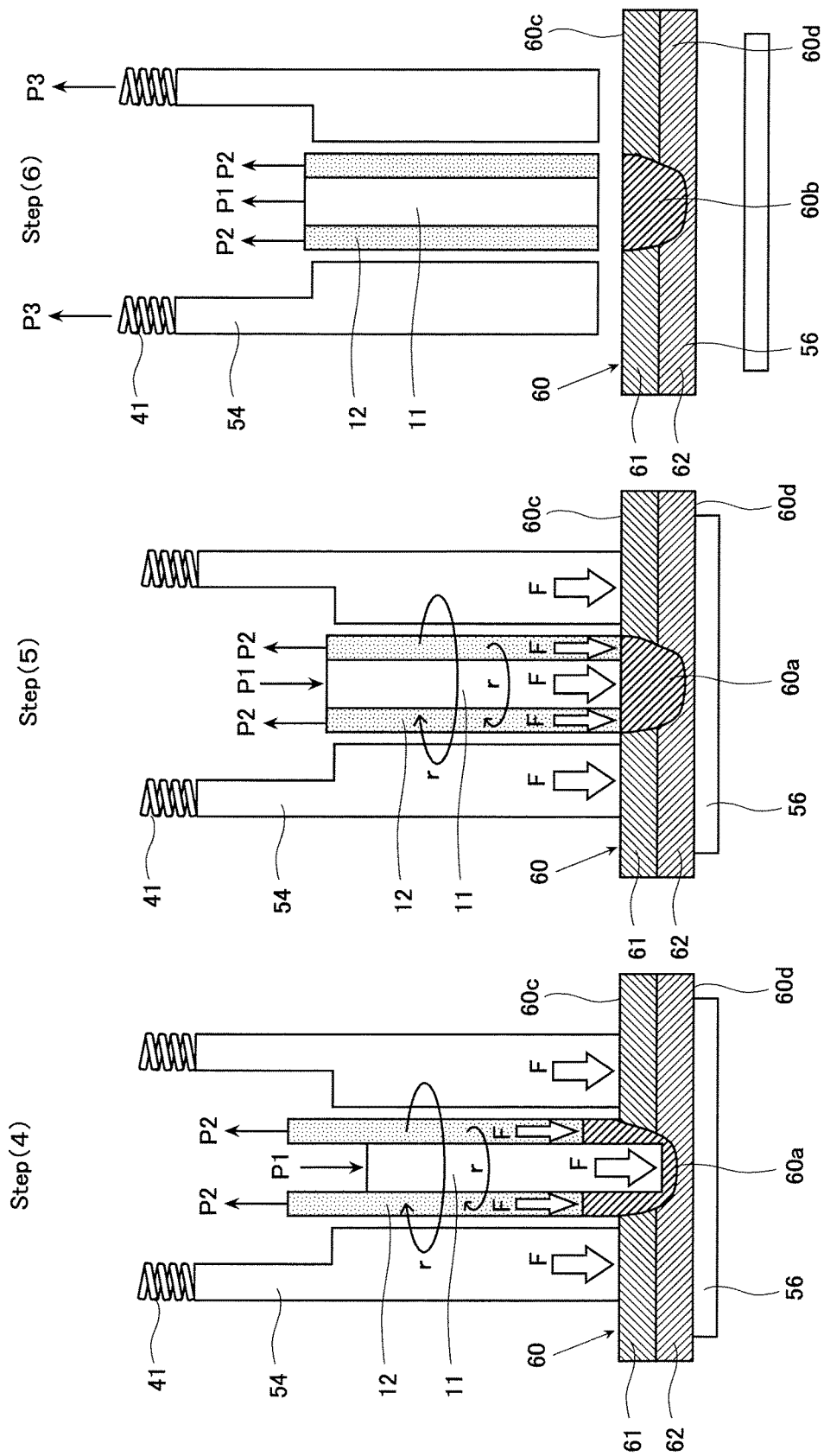
FIG. 3B is a schematic view showing an example of steps of the friction stir spot welding performed by the friction stir spot welding device of FIG. 1.

FIGS. 3A and 3B are schematic views showing an example of steps of friction stir spot welding performed by the friction stir spot welding device of FIG. 1. FIG. 4 is a schematic graph showing the tip end surface of the pin member, the tip end surface of the shoulder member, and the tool average position Tx in each of steps of the friction stir spot welding of FIG. 3.

In the example of FIGS. 3A and 3B, a part of the friction stir spot welding device 50 is not shown, arrows r indicate the rotational direction of the pin member 11 and the rotational direction of the shoulder member 12, respectively, and block arrows F indicate directions of forces applied to the metal plates 61, 62.

Although the forces are applied to the metal plates 61, 62 by the backing member 56, this is not shown in FIGS. 3A and 3B, for easier understanding of the description. The shoulder member 12 is hatched to be distinguished from the pin member 11 and the clamp member 54.

Figure 4:
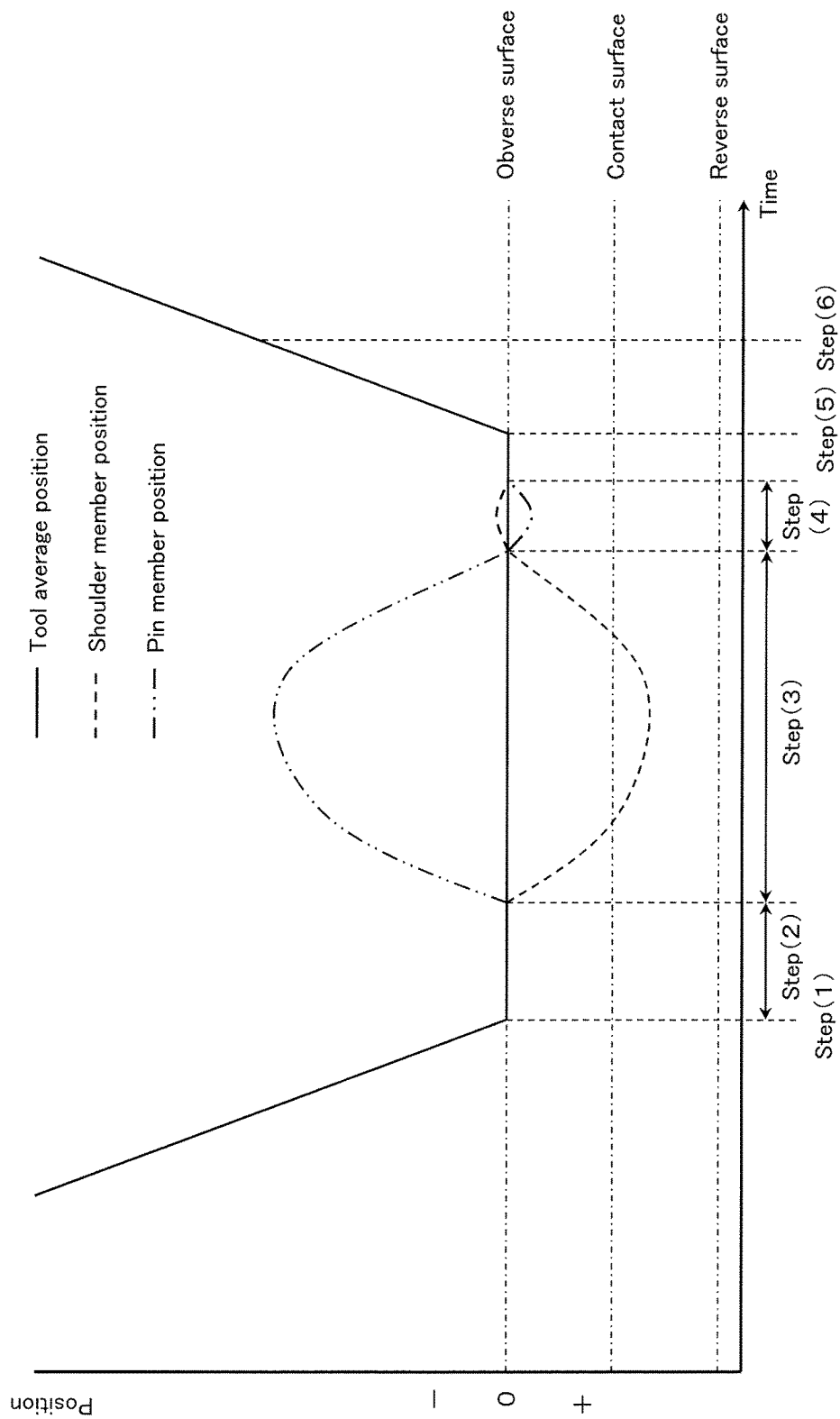
FIG. 4 is a schematic graph showing the tip end surface of a pin member, the tip end surface of a shoulder member, and an tool average position Tx in each of the steps of the friction stir spot welding of FIG. 3.

In FIG. 4, the position of the obverse surface 60c of the object 60, the position of the reverse surface 60d of the object 60, and the position of contact surfaces of the metal plates 61, 62 are indicated by dot-and-dash lines, respectively, Steps (1) to (6) of FIG. 4 correspond to steps (1) to (6), respectively of FIGS. 3A and 3B.

Hereinafter, an example of the welding operation of the single spot welding, which is performed by the friction stir spot welding device 50, will be described.

Initially, the object 60 is placed on the upper surface of the backing member 56. Then, the controller 51 drives the tool driving unit 53 to cause the pin member 11, the shoulder member 12, and the clamp member 54 to approach the object 60 (the metal plates 61, 62), and to bring the tip end surface 11a of the pin member 11, the tip end surface 12a of the shoulder member 12, and the tip end surface 54a of the clamp member 54 (these tip end surfaces are not shown in FIGS. 3A and 3B) into contact with the obverse surface 60c of the object 60 (see step (1) of FIG. 3A and FIG. 4).

Thus, the metal plates 61, 62 are retained between the clamp member 54 and the backing member 56, and the clamp driving unit 41 shrinks to bias the clamp member 54 toward the obverse surface 60c of the object 60, thereby generating a clamping force.

At this time, the controller 51 controls the tool driving unit 53 so that the pin member 11, the shoulder member 12, and the clamp member 54 press (push) the object 60 with a preset pressing force (e.g., predetermined value in a range of 3000 N to 8000 N). The welding pressure detected by the welding pressure detector 33 is input to the controller 51. In a case where the welding pressure detected by the welding pressure detector 33 is equal to a predetermined welding pressure, the controller 51 causes the memory unit 31 to store therein as the reference position the position of the tip end surface 11a of the pin member 11 or the tip end surface 12a of the shoulder member 12 which is detected by the position detector 21 at a time point when the welding pressure detector 33 has detected the predetermined welding pressure.

Then, the controller 51 drives the rotation driving unit 57 to rotate the pin member 11 and the shoulder member 12 in a state in which the pin member 11 and the shoulder member 12 are in contact with the obverse surface 60c of the object 60 (see step (2) of FIG. 3A and FIG. 4). In this state, the pin member 11 and the shoulder member 12 do not perform the advancing motion and the retracting motion. Therefore, the obverse surface 60c of the object 60 is preliminarily heated. By this preliminary heating, the metal material of the metal plate 61 which is in contact with the pin member 11 and the shoulder member 12 generates heat by a friction and is softened, causing a plasticized (plastic flow) region 60a to be generated in a region that is in the vicinity of the obverse surface 60c of the object 60.

Then, the controller 51 controls the pin driving unit 531 and/or the shoulder driving unit 532 (see FIG. 1) to cause the pin member 11 to be retracted from the obverse surface 60c of the object 60, and thereby causes the shoulder member 12 to be advanced into (pressed into) the obverse surface 60c of the object 60 (see step (3) of FIG. 3A and FIG. 4). At this time, a portion of the upper metal plate 61 and a portion of the lower metal plate 62 are softened, and thus the quantity of the plasticized region 60a is increased.

Then, the controller 51 controls the pin driving unit 531 to cause the retracted pin member 11 to be gradually advanced (plunged) into the metal plate 61. According to this advancing motion, the shoulder member 12 is retracted from the metal plate 61 (see step (4) of FIG. 3B and FIG. 4). Note that step (4) may not be performed if the obverse surface 60c of the object 60 is sufficiently shaped in step (5) which will be described later.

In a case where the controller 51 performs step (3) and step (4), the controller 51 controls the tool driving unit 53 so that the absolute value of the tool average position Tx is reduced (made small) as described above. A specific control for reducing the absolute value of the tool average position Tx is disclosed in Patent Literature 1 in detail, and will not be described herein.

The controller 51 preferably controls the tool driving unit 53 to realize the tool average position Tx=0 (the tool average position Tx is equal to 0). "The tool average position Tx=0" refers to a state in which the tool average position Tx is ±0 (Tx ≈0). In this state, it may be assumed that Tx is equal to 0, based on the units, significant digits, and other conditions of the cross-sectional area Ap of the pin member 11, the cross-sectional area As of the shoulder member 12, the plunge depth Pp of the pin member 11, and the plunge depth Ps of the shoulder member 12. Thus, depending on the various conditions such as the configuration and uses of the friction stir spot welding device 50, the tool average position Tx need not be reduced to 0, and the absolute value of the tool average position Tx may be set to a smallest possible value in practice so long as a favorable control is realized.

In a case where the controller 51 moves from step (3) to step (5), the controller 51 controls the pin driving unit 531 to cause the pin member 11 to be gradually advanced. In contrast, in a case where the controller 51 moves from step (3) to step (5) through step (4), the controller 51 controls the pin driving unit 531 to cause the pin member 11 to be gradually retracted. During the retracting motion of the pin member 11 or the shoulder member 12, the welding pressure applied by the tip end surface of the pin member 11 or the tip end surface of the shoulder member 12 is maintained (see arrows F of step (3) of FIG. 3A and step (4) of FIG. 3B).

In a case where the shoulder member 12 is retracted, the rotation and pressing operations of the pin member 11 are maintained. Therefore, the softened metal material of the plasticized region 60a moves from a region that is immediately below the pin member 11 to a region that is immediately below the shoulder member 12, so that a recess generated by the plunge of the shoulder member 12 into the material is backfilled.

In contrast, in a case where the pin member 11 is retracted, the rotation and pressing operations of the shoulder member 12 are maintained. Therefore, the softened metal material of the plasticized region 60a moves from a region that is immediately below the shoulder member 12 to a region that is immediately below the pin member 11, so that a recess generated by the plunge of the pin member 11 into the material is backfilled.

Then, the controller 51 controls the tool driving unit 53 so that the tip end surface 11a of the pin member 11 and the tip end surface 12a of the shoulder member 12 become coplanar with each other without a level difference between them (see step (5) of FIG. 3B and FIG. 4). In this way, the obverse surface 60c of the object 60 is shaped, and a substantially flat surface without substantial depressions can be obtained.

Then, the controller 51 controls the tool driving unit 53 to cause the pin member 11, the shoulder member 12, and the clamp member 54 to move away from the object 60. Then, the controller 51 controls the rotation driving unit 57 to stop the rotation of the pin member 11 and the rotation of the shoulder member 12. In this way, a series of friction stir spot welding steps (welding process for the object 60) are terminated (see step (6) of FIG. 3B and FIG. 4). In this state, the rotational force (and pressing force) which are applied by the pin member 11 and the shoulder member 12 which are in contact with the object 60 are not exerted on the metal plates 61, 62. Therefore, a plasticization (plastic flow) of the plasticized region 60a of the metal plates 61, 62 is ceased, and the plasticized region 60a becomes a welded region 60b. In this way, the two metal plates 61, 62 are joined (welded) to each other by the welded region 60b.

As described above, in the friction stir spot welding device 50 according to Embodiment 1, the controller 51 controls the members (the units) so that the absolute value of the tool average position Tx is reduced (made small). This makes it possible to realize a good welding quality with a suitable accuracy, and prevent or suppress generation of cavities in the materials.

The present inventors found that in a case where the serial spots welding is performed without using the friction stir spot welding method disclosed in the above-described Patent Literature 1 and without sufficiently cooling the pin member 11 and the shoulder member 12, a quality of the external appearance of the welded object is not good. The phrase "the serial spots welding is performed" means that the next welding process is performed without sufficiently cooling (e.g., air-cooling) the pin member 11 and/or the shoulder member 12. This means that the welding process is performed in high cycles, including a case where the next welding process is initiated within a specified time (e.g., several seconds (2 seconds)) after the previous welding process is finished, and/or a case where the next welding process is initiated in a state in which the temperature of the pin member 11 and the temperature of the shoulder member 12 are equal to or higher than a predetermined temperature.

The present inventors measured the temperature of the shoulder member 12 in cases where serial spots welding for two aluminum alloy 2024-T3 Clad materials (plate thickness is 0.8 mm) was performed, by use of various cooling methods, and found that defectives of the external appearance quality occurred (in most cases, depressions in the welded region) when the temperature was equal to or higher than 200 degrees C. In contrast, under the condition in which the temperature of the shoulder member was cooled to a temperature which was equal to or lower than 20 to 60 degrees C., an increase in the temperature of the tool was not observed, and the defectives of the external appearance quality (in most cases, depressions in the welded region) did not occur, even though the welding was performed in repetition. The thresholds of these temperatures are different depending on the materials to be welded, the plate thickness of the materials to be welded, and the material of the shoulder member, and are not defined without any exception.

The present inventors presume that occurrence of the defectives of the external appearance quality in a case where the serial spots welding is performed is due to the reasons (factors) which will be described later. Now, this will be described in detail with reference to FIGS. 5A, 5B and 6.

Figure 5:
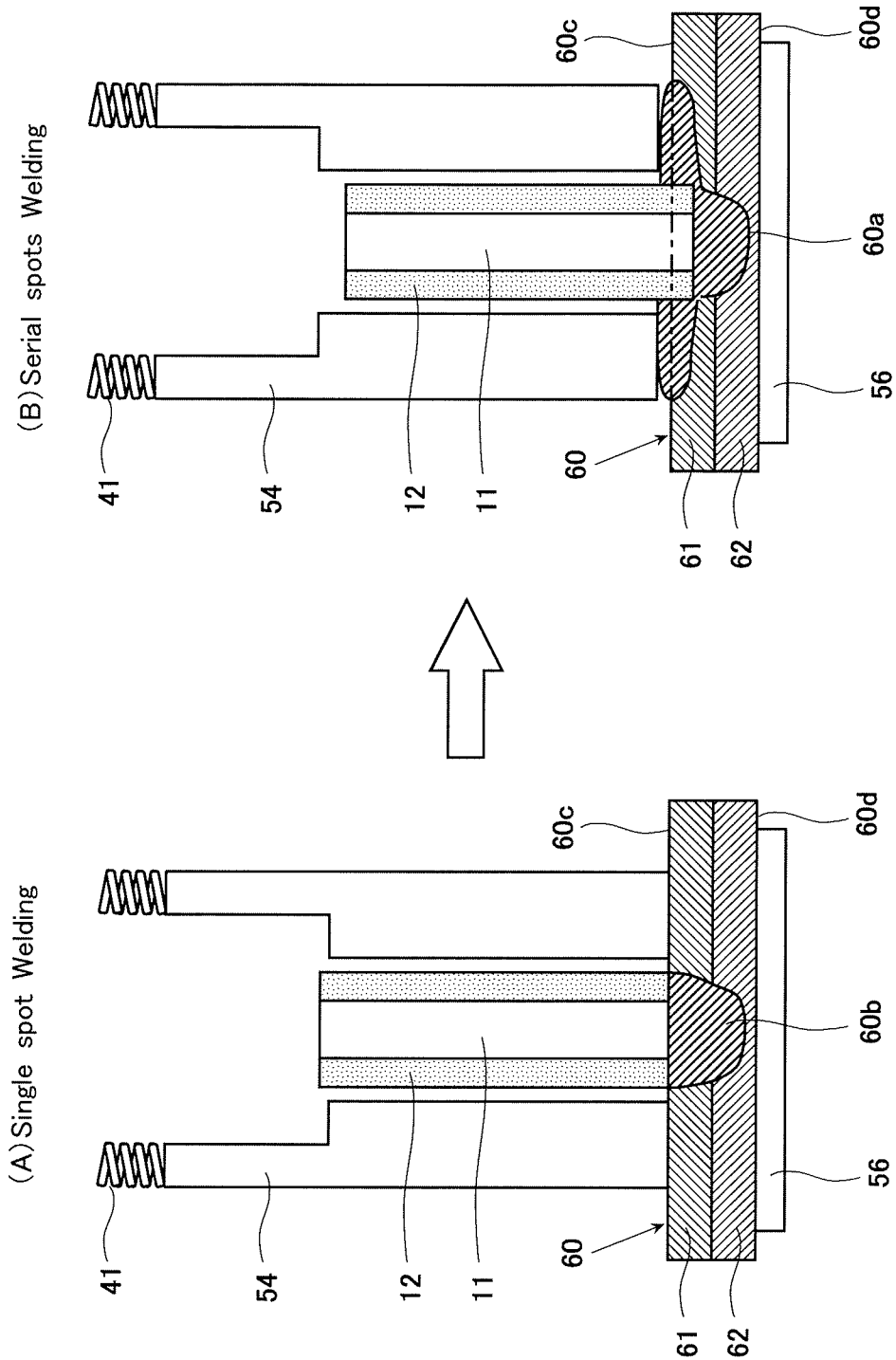
FIGS. 5A and 5B are schematic views showing a state of step (5) in a case where an object to be welded is welded by use of the friction stir spot welding device.
Figure 6:
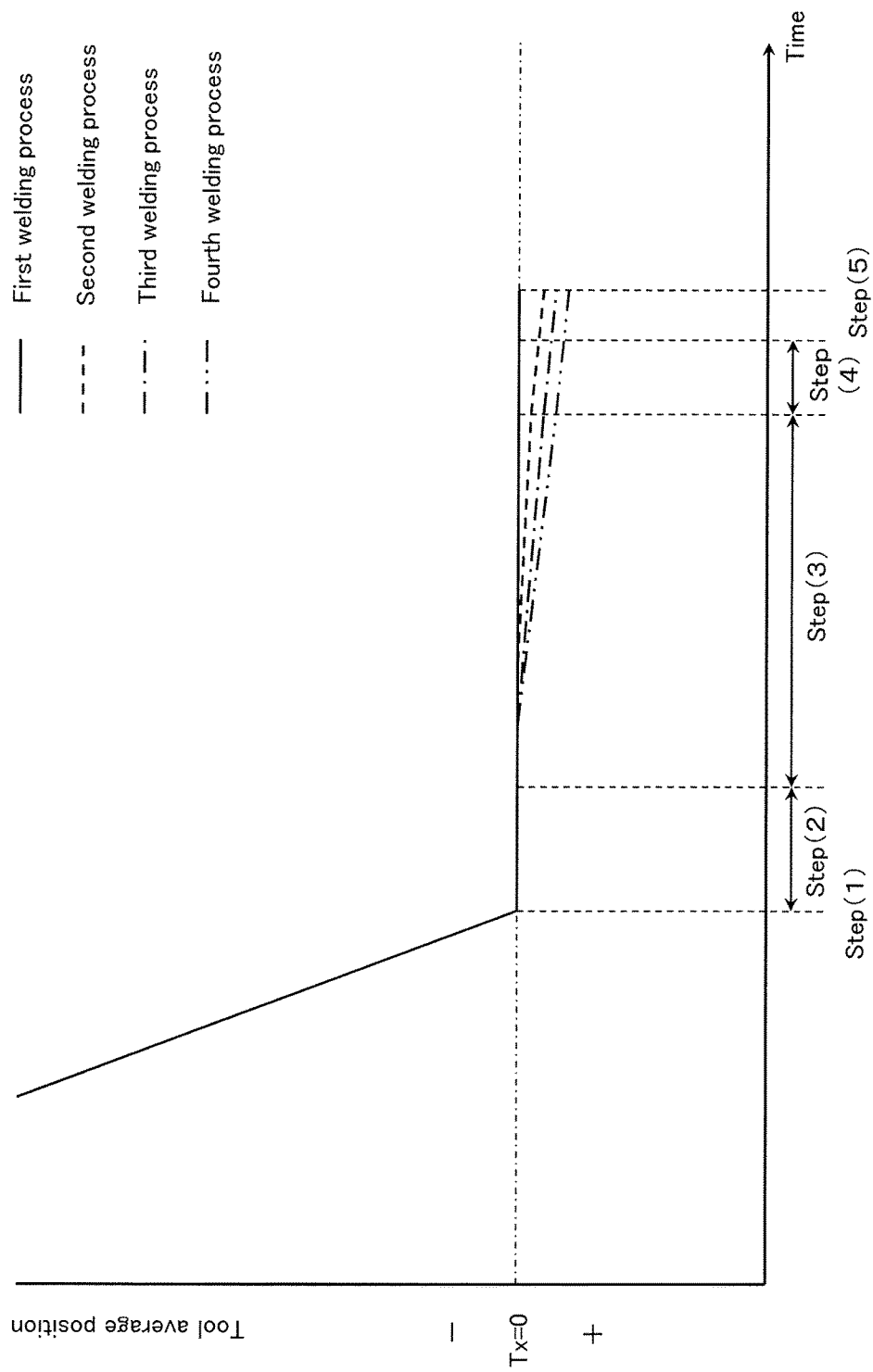
FIG. 6 is a schematic graph showing the tool average position Tx in a case where serial spots welding for the object to be welded is performed, by use of the friction stir spot welding device according to Embodiment 1.

FIGS. 5A and 5B are schematic views showing a state of step (5) in a case where the object is welded by use of the friction stir spot welding device. FIG. 5A shows a state (A) of step (5) in a case where the single spot welding is performed, while FIG. 5B shows a state (B) of step (5) in a case where the serial spots welding is performed. FIG. 6 is a schematic graph showing the tool average position Tx in a case where the serial spots welding for the object is performed, by use of the friction stir spot welding device according to Embodiment 1.

In the example of FIG. 6, the controller 51 causes the tip end surface 11a of the pin member 11 and the tip end surface 12a of the shoulder member 12 to be located on the obverse surface 60c of the object 60 (reference position), when the tip end surface 11a of the pin member 11 and the tip end surface 12a of the shoulder member 12 are made coplanar with each other in step (5). FIG. 6 shows the tool average positions Tx in the welding processes performed four times in succession to weld different regions of the object. In the example of FIG. 6, a plunge direction (downward direction in FIG. 1) of the pin member 11 and the shoulder member 12 is defined as "positive direction." In the example of FIG. 6, plotting of step (6) is omitted.

As shown in FIG. 5A, in a case where the single spot welding for the object 60 is performed, the tip end surface 11a of the pin member 11 and the tip end surface 12a of the shoulder member 12 are located on the obverse surface 60c of the object 60 (reference position), when the tip end surface 11a of the pin member 11 and the tip end surface 12a of the shoulder member 12 are made coplanar with each other in step (5).

However, in a case where the serial spots welding for the object 60 was performed under the same control conditions as those in a case where the single spot welding for the object 60 was performed, regions of the object 60 with which the pin member 11 and the shoulder member 12 were in contact were depressed, and a region of the object 60 with which the clamp member 54 was in contact was raised (not shown).

The tool average positions Tx in a case where the serial spots welding for the object was performed were plotted. As shown in FIG. 6, in a case where the serial spots welding for the object was performed under the same control conditions as those in a case where the single spot welding for the object 60 was performed, the tip end surface 11a of the pin member 11 and the tip end surface 12a of the shoulder member 12 could not be controlled to be located on the obverse surface 60c of the object 60 (reference position), and the tool average positions Tx had positive values, respectively, in step (5).

From the above-described results, the present inventors presume that the friction stir spot welding device 50 is in the state of FIG. 5(B) in step (5). Specifically, the tip end surface 11a of the pin member 11 and the tip end surface 12a of the shoulder member 12 are located in a region (first region) inward relative to the reference position (the reference position is the obverse surface 60c of the object 60). On the other hand, the tip end surface 54a of the clamp member 54 is located in a region (second region) outward relative to the reference position.

The present inventors presume that this phenomenon results from the following events. The next welding process is initiated in a state in which heat generated by a friction is accumulated in the pin member 11 and the shoulder member 12. For this reason, the metal material is softened in a shorter time than in a case where the single spot welding is performed. As a result, in a case where the serial spots welding is performed under the conditions in which a time, a rotational speed, or a pressing force are the same as those in a case where the single spot welding is performed, the amount of the softened material increases, and the softened material moves to a region outward of the shoulder member 12 (to a region on the clamp member 54 side).

The present inventors discovered that in a case where the serial spots welding for the object is performed, a good welding quality is realized, by performing a treatment for preventing the flow of the softened material, before the next welding process is initiated. In this way, the present invention has been conceived.

Specifically, the present inventors discovered that the above-described problem can be solved by reducing the pressing forces applied to the object 60 and/or by reducing the rotational speed of the pin member 11 and the rotational speed of the shoulder member 12, in a case where the position (first position) of the tip end surface of the pin member 11 or the tip end surface of the shoulder member 12 which is detected by the position detector 21 is within the first region, when the welding process for the object 60 ends.

Hereinafter, the operation (control method) performed in a case where the serial spots welding is performed in the friction stir spot welding device 50 according to Embodiment 1 will be described.

[Serial Spots Welding Operation of Friction Stir Spot Welding Device]

Figure 7:
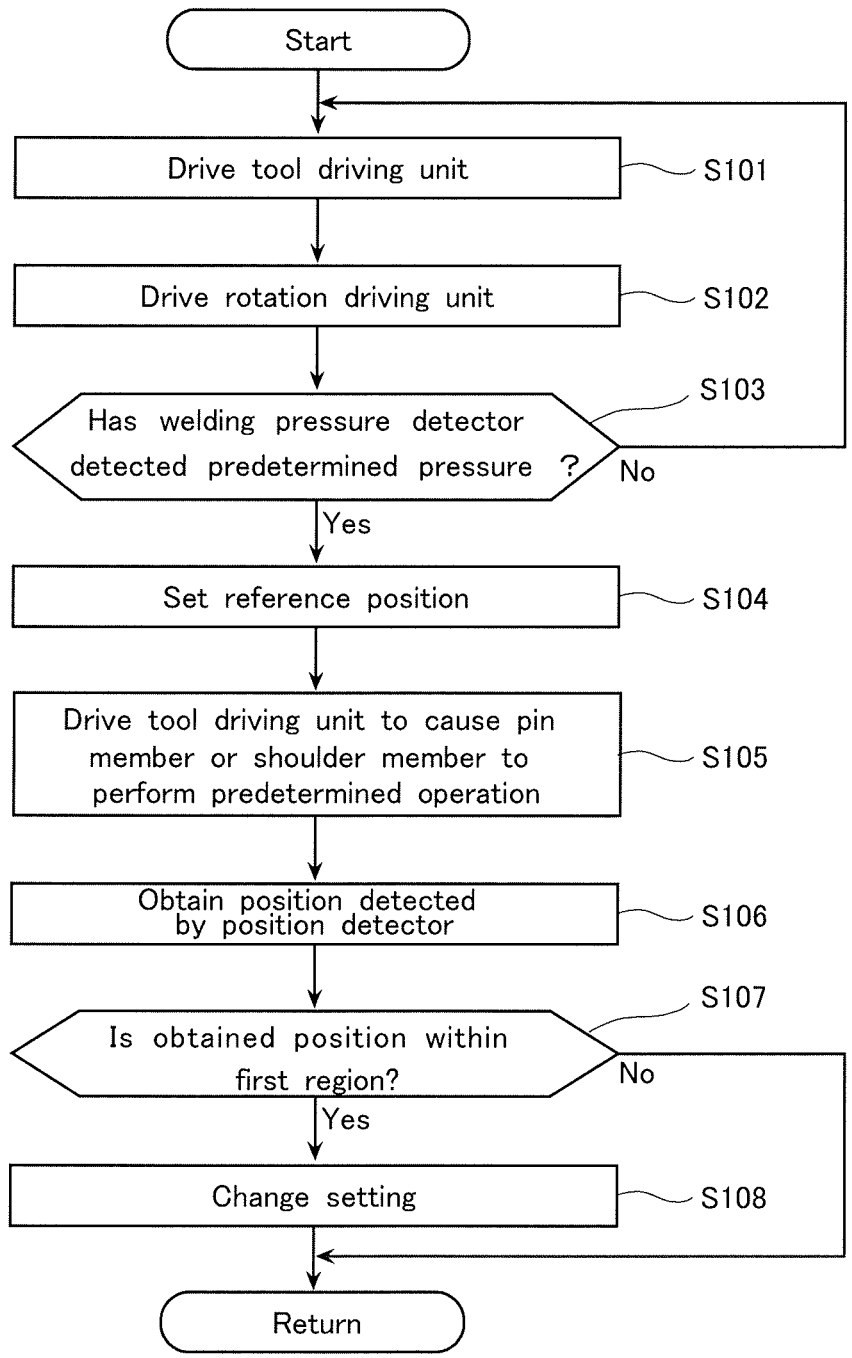
FIG. 7 is a flowchart showing the exemplary operation of the friction stir spot welding device according to Embodiment 1 in a case where the serial spots welding is performed.

FIG. 7 is a flowchart showing the exemplary operation of the friction stir spot welding device according to Embodiment 1 in a case where the serial spots welding is performed.

As shown in FIG. 7, the controller 51 drives the tool driving unit 53 to initiate the welding process for the object 60 (step S101). The pin member 11, the shoulder member 12, and the clamp member 54 move toward the object 60 (the metal plates 61, 62).

Then, the controller 51 drives the rotation driving unit 57 at a preset rotational speed to rotate the pin member 11 and the shoulder member 12 (step S102). The pin member 11, the shoulder member 12, and the clamp member 54 approach the object 60 while the pin member 11 and the shoulder member 12 are rotated.

Although in Embodiment 1, the controller 51 drives the rotation driving unit 57 after it drives the tool driving unit 53, this is merely exemplary. For example, the controller 51 may drive the tool driving unit 53 after it drives the rotation driving unit 57. Further, for example, the controller 51 may drive the tool driving unit 53 to cause the pin member 11, the shoulder member 12, and the clamp member 54 to contact the object 60, and then drive the rotation driving unit 57.

Then, the controller 51 determines whether or not the welding pressure detector 33 has detected the predetermined pressure (step S103). As described above, the controller 51 controls the tool driving unit 53 so that the pin member 11, the shoulder member 12, and the clamp member 54 press the object 60 with the predetermined pressing force. In this configuration, in a case where the pressure detected by the welding pressure detector 33 is equal to the predetermined pressure, the controller 51 can determine that the tip end surface 11a of the pin member 11 and the tip end surface 12a of the shoulder member 12a are in contact with the obverse surface 60c of the object 60.

In a case where the welding pressure detector 33 has detected the predetermined pressure (Yes in step S103), the controller 51 moves to step S104. On the other hand, in a case where the welding pressure detector 33 does not detect the predetermined pressure (No in step S103), the controller 51 repeats step S101 to step S103 until the welding pressure detector 33 detects the predetermined pressure.

As described above, when the pin member 11 and the shoulder member 12 contact the object 60, they stay on the obverse surface 60c of the object 60 until the material is softened. Also, in a case where the clamp member is provided, the clamp member stays on the obverse surface 60c of the object 60 after the material is softened.

In a case where the welding pressure detector 33 has detected the predetermined pressure, the controller 51 sets as the reference position the position of the tip end surface 11a of the pin member 11 or the tip end surface 12a of the shoulder member 12a which is detected by the position detector 21 (the controller 51 causes the memory unit 31 to store the position as the reference position) (step S104).

Although in Embodiment 1, the controller 51 sets the reference position after the controller 51 has driven the rotation driving unit 57, this is merely exemplary. The controller 51 may set the reference position before the controller 51 drives the rotation driving unit 57. In this case, a threshold of the pressing force in step of setting the reference position (step (1)) and the value of the pressing force exerted while the pin member 11 or the like which is in contact with the metal plate 61 is rotated (step (2) to step (5)) may be set to an equal value or different values. For example, the threshold of the pressing force exerted in step (1) may be set to be smaller than that of the pressing force exerted in step (2) to step (5). Further, in a case where the clamp member is provided, the reference position may be set at a time point that is just before step (3) is initiated.

Then, the controller 51 controls the tool driving unit 53 to cause the pin member 11 or the shoulder member 12 to perform a predetermined operation (step S105). Specifically, the controller 51 controls the tool driving unit 53 according to a predetermined control program. At this time, the controller 51 preferably controls the tool driving unit 53 so that the absolute value of the tool average position Tx is reduced. More preferably, the controller 51 controls the tool driving unit 53 to realize the tool average position Tx=0.

The controller 51 causes the pin member 11 and the shoulder member 12 to be retracted from the obverse surface 60c of the object 60. When the welding process for the object 60 ends, the controller 51 controls the tool driving unit 53 so that the tip end surface 11a of the pin member 11 and the tip end surface 12a of the shoulder member 12 become coplanar with each other.

Then, the controller 51 obtains the position of the tip end surface 11a of the pin member 11 or the position of the tip end surface 12a of the shoulder member 12 which is detected by the position detector 21 at a time point when the tip end surface 11a of the pin member 11 and the tip end surface 12a of the shoulder member 12a have become coplanar with each other (step S106). Then, the controller 51 determines whether or not the position obtained in step S106 is within the first region (step S107).

In a case where the controller 51 determines that the position (the first position) obtained in step S106 is not within the first region (No in step S107), the controller 51 returns to the start of the present flow, and initiates the next welding process.

On the other hand, in a case where the controller 51 determines that the position obtained in step S106 is within the first region (Yes in step S107), the controller 51 changes setting of the pressing forces and/or the rotational speeds (step S108), returns to the start of the present flow, and initiates the next welding process.

Specifically, the controller 51 changes setting of the tool driving unit 53 to reduce the pressing forces applied to the object 60 in the next welding process so that the pressing forces become smaller than the predetermined pressing force, and/or changes setting of the rotation driving unit 57 to reduce the rotational speed of the pin member 11 and the rotational speed of the shoulder member 12 in the next welding process so that these rotational speeds become lower than the predetermined rotational speed. More specifically, the controller 51 reduces the operation amount of the tool driving unit 53 and/or reduces the operation amount of the rotation driving unit 57.

By the above-described control, it becomes possible to suppress the metal material from being excessively softened and the softened material from moving toward the clamp member 54.

As described above, in the friction stir spot welding device 50 according to Embodiment 1, by reducing the pressing force applied to the object 60 by the pin member 11 and the pressing force applied to the object 60 by the shoulder member 12 and/or by reducing the rotational speed of the pin member 11 and the rotational speed of the shoulder member 12 in a case where the serial spots welding is performed. As a result, a good external appearance quality of the welded region of the object 60 can be secured well, and a good welding quality can be realized.

[Modified Example 1]

Next, the modified example of the friction stir spot welding device 50 according to Embodiment 1 will be described.

In a friction stir spot welding device according to Modified Example 1 of Embodiment 1, the controller controls the tool driving unit to reduce the pressing force applied to the object by the pin member and the pressing force applied to the object by the shoulder member in the next welding process and/or controls the rotation driving unit to reduce the rotational speed of the pin member and the rotational speed of the shoulder member in the next welding process, in a case where the first position is within the first region at a time point when the welding process for the object has ended, and the temperature of the pin member and the temperature of the shoulder member are equal to or higher than a predetermined temperature at a time point when the next welding process is initiated.

The friction stir spot welding device 50 according to Modified Example 1 is configured as in the friction stir spot welding device 50 according to Embodiment 1 and the constituents thereof will not be described.

[Serial Spots Welding Operation of Friction Stir Spot Welding Device]

Figure 8:
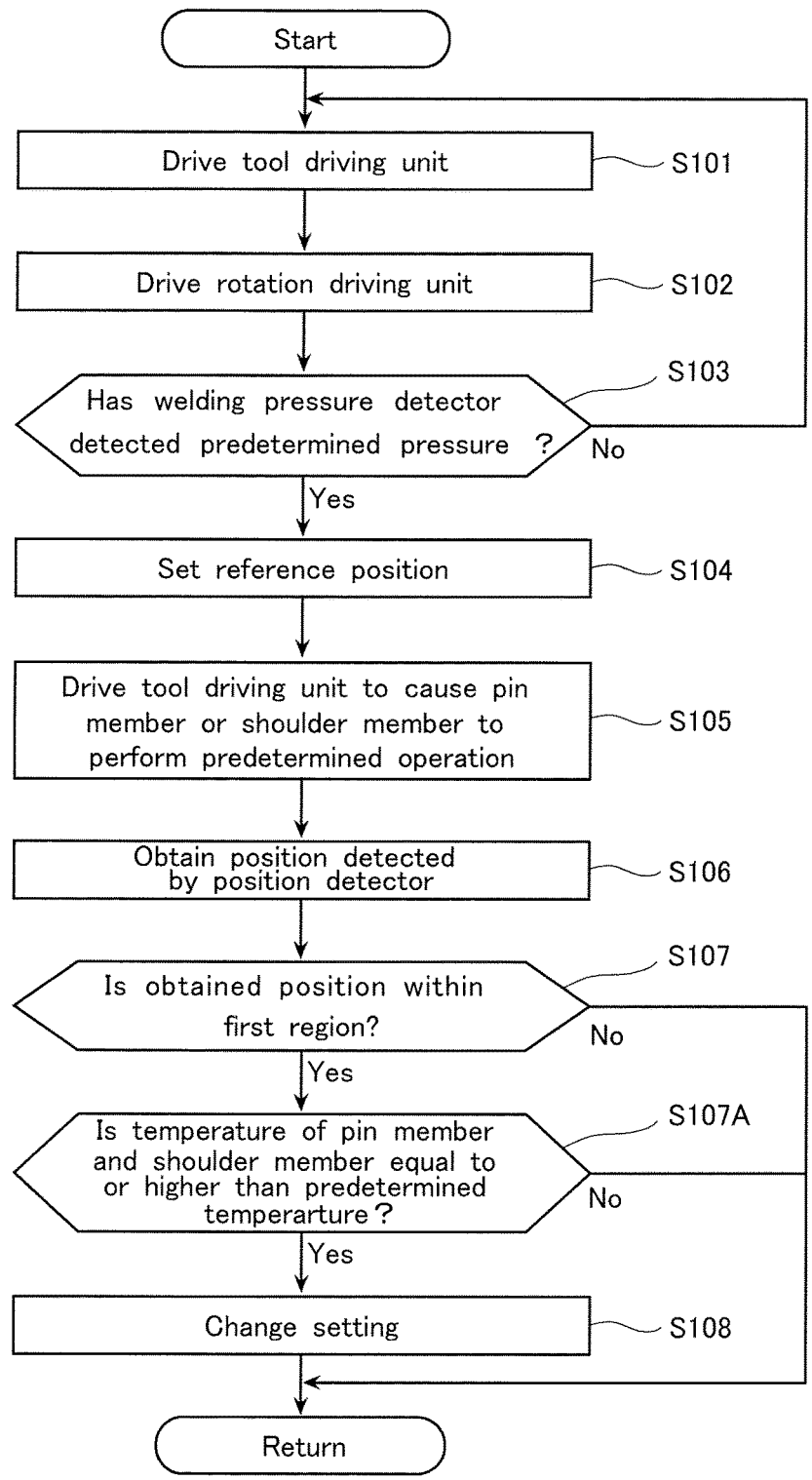
FIG. 8 is a flowchart showing the exemplary operation of a friction stir spot welding device according to Modified Example of 1 Embodiment 1 in a case where the serial spots welding is performed.

FIG. 8 is a flowchart showing the exemplary operation of the friction stir spot welding device according to Modified example 1 of Embodiment 1 in a case where the serial spots welding is performed.

As shown in FIG. 8, the serial spots welding operation performed by the friction stir spot welding device 50 according to Modified example 1 is basically the same as that of the friction stir spot welding device 50 according to Embodiment 1 and is different in that step S107A is performed between step S107 and step S108 in the serial spots welding operation performed by the friction stir spot welding device 50 according to Modified example 1.

Specifically, in a case where the controller 51 determines that the position (the first position) obtained in step S106 is within the first region (Yes in step S107), the controller 51 moves to step S107A. In step S107A, the controller 51 determines whether or not the temperature of the pin member 11 and the temperature of the shoulder member 12 are equal to or higher than the predetermined temperature, when a command directing the initiation of the next welding process is input.

The predetermined temperature can be pre-set by an experiment or the like, and may be set to a value in a range of, for example, 20 to 60 degrees C. For example, the temperature of the pin member 11 and the temperature of the shoulder member 12 may be directly detected by use of an infrared temperature sensor or the like, or may be indirectly detected based on the temperature of the object 60 or the like, the number of times the welding for the object 60 was performed, etc.

Then, in a case where the controller 51 determines that the first position is within the first region and the temperature of the pin member 11 and the temperature of the shoulder member 12 are equal to or higher than the predetermined temperature (Yes in step S107A), the controller 51 changes setting of the pressing forces and/or the rotational speeds (step S108), returns to the start of the present flow, and initiates the next welding process.

On the other hand, in a case where the controller 51 determines that the temperature of the pin member 11 and the temperature of the shoulder member 12 are lower than the predetermined temperature (No in step S107A), the controller 51 returns to the start of the present flow, and initiates the next welding process.

The friction stir spot welding device 50 according to Modified example 1 configured as described above can obtain advantages similar to those of the friction stir spot welding device 50 according to Embodiment 1.

[Modified Example 2]

In a friction stir spot welding device according to Modified Example 2 of Embodiment 1, in a case where the first position is within the first region at a time point when the welding process for the object has ended, and a time that passes from when the welding process for the object has ended until the next welding process is initiated is within a predetermined time, the controller controls the tool driving unit to reduce the pressing force applied to the object by the pin member and the pressing force applied to the object by the shoulder member in the next welding process and/or controls the rotation driving unit to reduce the rotational speed of the pin member and the rotational speed of the shoulder member in the next welding process.

The friction stir spot welding device 50 according to Modified Example 2 is configured as in the friction stir spot welding device 50 according to Embodiment 1 and the constituents thereof will not be described.

[Serial Spots Welding Operation of Friction Stir Spot Welding Device]

Figure 9:
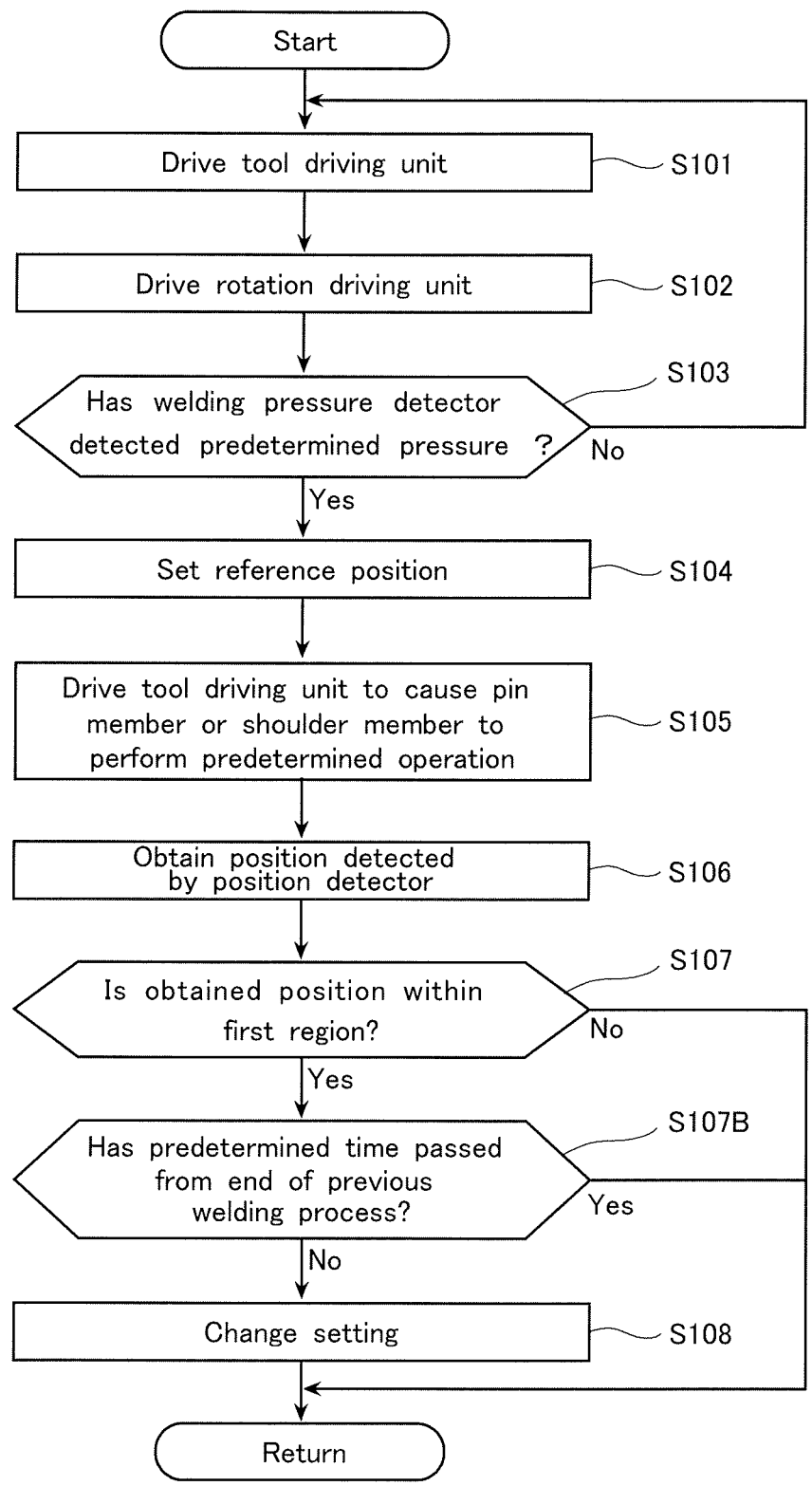
FIG. 9 is a flowchart showing the exemplary operation of a friction stir spot welding device according to Modified Example 2 of Embodiment 1 in a case where the serial spots welding is performed.

FIG. 9 is a flowchart showing the exemplary operation of the friction stir spot welding device according to Modified example 2 of Embodiment 1 in a case where the serial spots welding is performed.

As shown in FIG. 9, the serial spots welding operation performed by the friction stir spot welding device 50 according to Modified example 2 is basically the same as that of the friction stir spot welding device 50 according to Embodiment 1 and is different in that step S107B is performed between step S107 and step S108 in the serial spots welding operation performed by the friction stir spot welding device 50 according to Modified example 2.

Specifically, in a case where the controller 51 determines that the position (the first position) obtained in step S106 is within the first region (Yes in step S107), the controller 51 moves to step S107B. In step S107B, the controller 51 measures a time that passes from when the previous welding process has ended until a command directing the initiation of the next welding process is input, and determines whether or not the measured time is equal to or longer than a predetermined time.

The predetermined time can be preset by an experiment or the like. For example, the predetermined time may be set to 5 to 7 seconds. A timer (not shown) of the controller 51 measures the time.

In a case where the controller 51 determines that the first position is within the first region and the time that passes from when the previous welding process has ended until the command directing the initiation of the next welding process is input is shorter than the predetermined time (Yes in step S107B), the controller 51 changes setting of the pressing forces and/or the rotational speeds (step S108), returns to the start of the present flow, and initiates the next welding process.

On the other hand, in a case where the controller 51 determines that the time that passes from when the previous welding process has ended until the command directing the initiation of the next welding process is input is equal to or longer than the predetermined time (No in step S107B), the controller 51 returns to the start of the present flow, and initiates the next welding process.

The friction stir spot welding device 50 according to Modified example 2 configured as described above can obtain advantages similar to those of the friction stir spot welding device 50 according to Embodiment 1.

Although in the friction stir spot welding device 50 according to Modified example 2, the controller 51 changes setting of the pressing forces and/or the rotational speeds in a case where the controller 51 determines that the first position is within the first region and the time that passes from when the previous welding process has ended until the command directing the initiation of the next welding process is input is shorter than the predetermined time, this is merely exemplary.

The controller 51 may change setting of the pressing forces and/or the rotational speeds in a case where the controller 51 determines that the first position is within the first region, the time that passes from when the previous welding process has ended until the command directing the initiation of the next welding process is input is shorter than the predetermined time, and the temperature of the pin member 11 and the temperature of the shoulder member 12 are equal to or higher than the predetermined temperature when the command directing the initiation of the next welding process is input.

[Modified Example 3]

The configuration of the friction stir spot welding device 50 according to Modified Example 3 of Embodiment 1 is basically the same as that of the friction stir spot welding device 50 according to Embodiment 1, and is different in that the welding pressure detector 33 is omitted in the friction stir spot welding device 50 according to Modified Example 3. In addition, the serial spots welding operation of the friction stir spot welding device 50 according to Modified Example 3 is the same as that of the friction stir spot welding device 50 according to Embodiment 1 except for a setting method of the reference position. Specifically, an operator visually checks whether or not the tip end surface 11a of the pin member 11 or the tip end surface 12a of the shoulder member 12 is in contact with the obverse surface of the object 60, and the controller 51 causes the memory unit 31 to store as the reference position the position detected by the position detector 21 when the operator confirms that the tip end surface 11a of the pin member 11 or the tip end surface 12a of the shoulder member 12 is in contact with the obverse surface of the object 60.

In the friction stir spot welding device 50 according to Modified Example 3, the reference position is pre-stored in the memory unit 31. Therefore, in the serial spots welding operation of Modified Example 3, step S103 of the serial spots welding operation of FIG. 7 is omitted. The friction stir spot welding device 50 according to Modified Example 3 configured as described above can obtain advantages similar to those of the friction stir spot welding device 50 according to Embodiment 1.

It is sufficient that the reference position(s) corresponding to one or more spots to be welded is/are stored in the memory unit 31 prior to the serial spots welding operation. For example, the reference positions corresponding to all of the spots to be welded may be stored in the memory unit 31, the reference positions corresponding to a plurality of spots to be welded may be stored in the memory unit 31, or the reference position corresponding to one spot to be welded may be stored in the memory unit 31.

Except for the above-described features, the friction stir spot welding device 50 according to Modified Example 3 may be configured as in the friction stir spot welding device 50 according to Modified Example 1 or Modified Example 2.

[Modified Example 4]

As described above, after the pin member 11 or the shoulder member 12 contacts the object 60, the rotation driving unit 57 rotates the pin member 11 or the shoulder member 12, and then the tool driving unit 53 causes the pin member 11 or the shoulder member 12 (one of the pin member 11 and the shoulder member 12) to be advanced (plunged) into the object 60 from the obverse surface 60c. This means that at a time point before the pin member 11 or the shoulder member 12 is driven, the tip end surface 11a of the pin member 11 or the tip end surface 12a of the shoulder member 12 is located on the obverse surface 60c of the object 60.

In view of this, in the friction stir spot welding device 50 according to Modified Example 4, the controller 51 sets as the reference position the position detected by the position detector 21 at a time point just before the controller 51 controls the tool driving unit 53 to drive the pin member 11 or the shoulder member 12.

Hereinafter, the operation of the friction stir spot welding device 50 according to Modified Example 4 will be specifically described with reference to FIG. 10. The friction stir spot welding device 50 according to Modified Example 4 is configured as in the friction stir spot welding device 50 according to Embodiment 1 and the constituents thereof will not be described.

Figure 10:
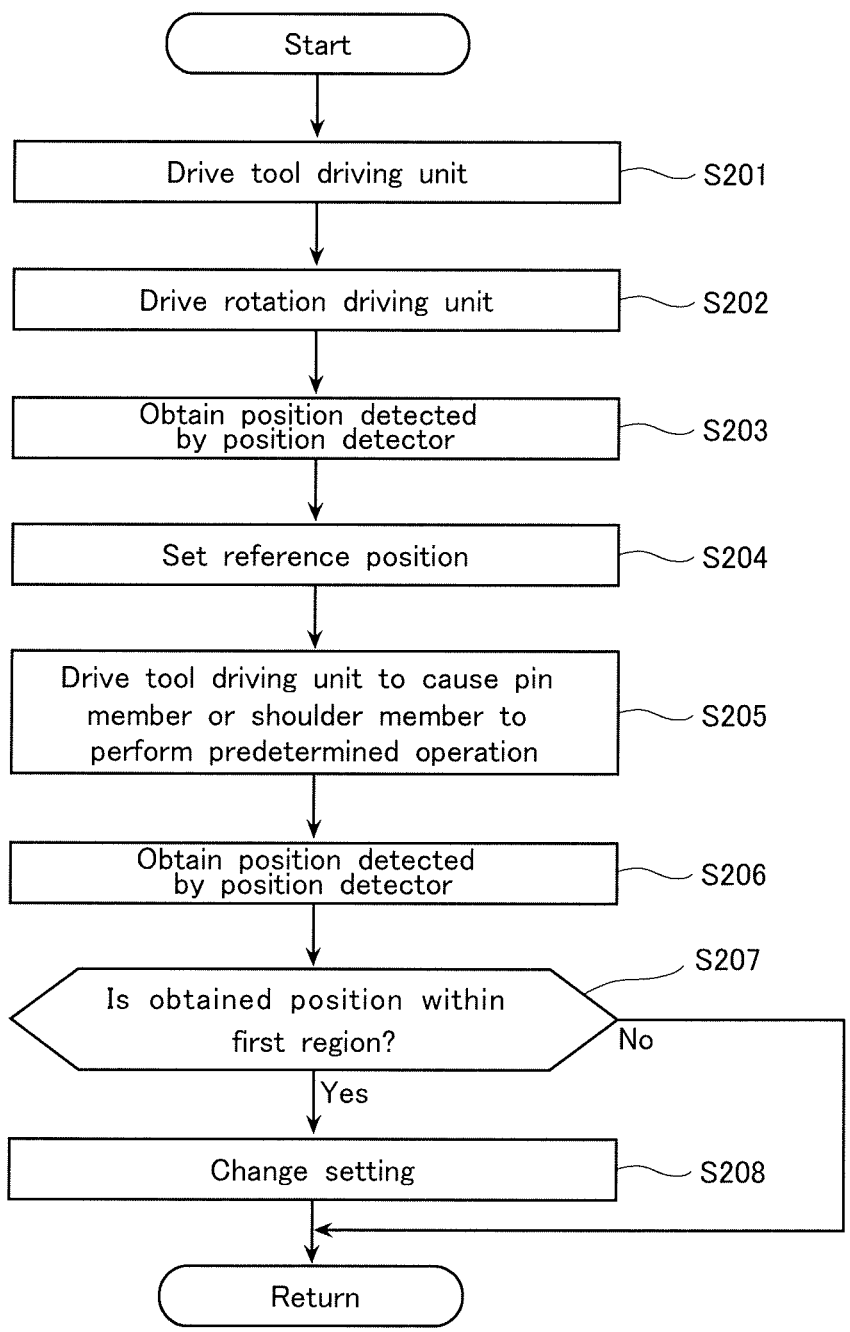
FIG. 10 is a flowchart showing the exemplary operation of a friction stir spot welding device according to Modified Example 4 of Embodiment 1 in a case where the serial spots welding is performed.

FIG. 10 is a flowchart showing the exemplary operation of the friction stir spot welding device according to Modified Example 4 of Embodiment 1 in a case where the serial spots welding is performed.

As shown in FIG. 10, the controller 51 drives the tool driving unit 53 to initiate the welding process for the object (step S201). Then, the controller 51 drives the rotation driving unit 57 at the preset rotational speed to rotate the pin member 11 and the shoulder member 12 in a state in which the pin member 11 and the shoulder member 12 are in contact with the obverse surface 60c of the object 60. As described above, at this time, the pin member 11 or the shoulder member 12 stays on the obverse surface 60c of the object 60 for a time period that passes until the material is softened.

Then, the controller 51 obtains the position of the tip end surface 11a of the pin member 11 or the position of the tip end surface 12a of the shoulder member 12 which is detected by the position detector 21, immediately before the controller 51 outputs the control signal to the tool driving unit 53 in step S205 (step S203). Then, the controller 51 sets as the reference position the position obtained in step S203 (updates the reference position stored in the memory unit 31) (step S204).

Then, the controller 51 performs step S205 to step S208. Step S205 to step S208 are the same as those of step S105 to step S108 of FIG. 7, and will not be described.

As described above, in the friction stir spot welding device 50 according to Modified Example 4, the controller 51 is configured to update the reference position in step S204 in a case where the serial spots welding is performed. The friction stir spot welding device 50 according to Modified example 4 configured as described above can obtain advantages similar to those of the friction stir spot welding device 50 according to Embodiment 1.

In the friction stir spot welding device 50 according to Modified Example 4, the reference position(s) corresponding to one or more spots to be welded may be stored in the memory unit 31 prior to the serial spots welding process, as in Modified Example 3, and the reference position stored in the memory unit 31 may be updated when the object 60 is welded.

In the friction stir spot welding device 50 according to Modified Example 4, the reference position(s) corresponding to one or more spots to be welded may be stored in the memory unit 31 prior to the serial spots welding process, as in Modified Example 4, and the position obtained in step S203 may be further stored as the reference position in the memory unit 31 containing the reference position(s), when the object 60 is welded.

Except for the above-described features, the friction stir spot welding device 50 according to Modified Example 4 may be configured as in the friction stir spot welding device 50 according to any of Modified Example 1 to Modified Example 3.

[Modified Example 5]

In a friction stir spot welding device according to Modified Example 5, the controller controls the tool driving unit to reduce the pressing force applied to the object by the pin member and the pressing force applied to the object by the shoulder member in the next welding process and/or controls the rotation driving unit to reduce the rotational speed of the pin member and the rotational speed of the shoulder member in the next welding process, in a case where an tool average position Tx1 which is the tool average position Tx calculated based on the first position as the reference is outside a proper range pre-set by an experiment or the like. The friction stir spot welding device 50 according to Modified Example 5 is configured as in the friction stir spot welding device 50 according to Embodiment 1 and the constituents thereof will not be described.

[Serial Spots Welding Operation of Friction Stir Spot Welding Device]

Figure 11:
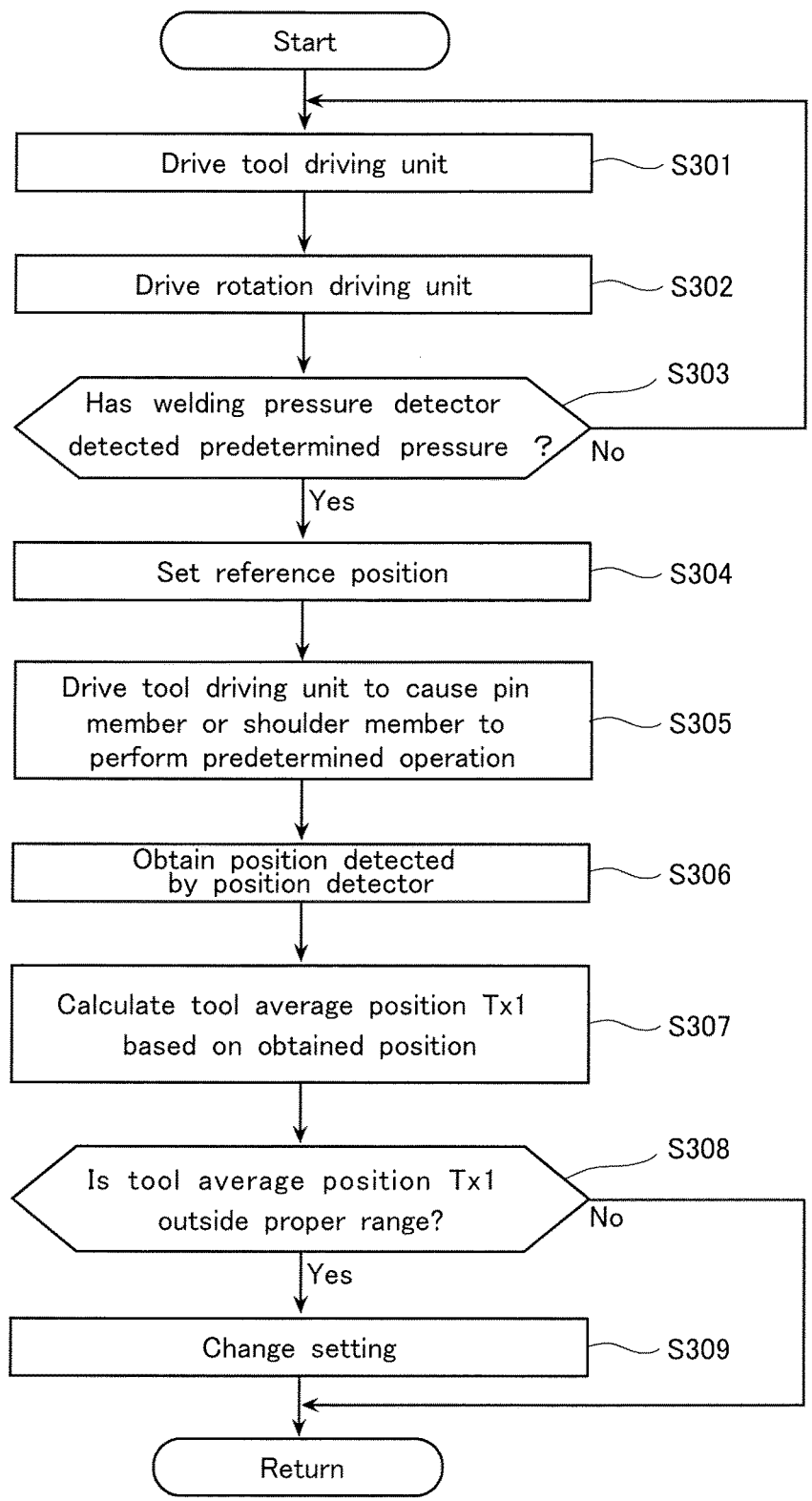
FIG. 11 is a flowchart showing the exemplary operation of a friction stir spot welding device according to Modified Example 5 of Embodiment 1 in a case where the serial spots welding is performed.

FIG. 11 is a flowchart showing the exemplary operation of the friction stir spot welding device according to Modified example 5 of Embodiment 1 in a case where the serial spots welding is performed.

As shown in FIG. 11, in the serial spots welding operation performed by the friction stir spot welding device 50 according to Modified example 5, step S301 to step S306 are the same as step S101 to step 106 of Embodiment 1 of FIG. 7, and the operation which occurs after step S307 is different. Now, this different operation will be described in detail.

In step S307, the controller 51 calculates the tool average position Tx1 (Ap·Pp+As·Ps) based on the position (the first position) obtained in step S306, as the reference. Then, the controller 51 determines whether or not the tool average position Tx1 calculated in step S307 is within the proper range (step S308).

The proper range of the tool average position Tx1 is changed as desired depending on, for example, the metal material constituting the object 60, and can be pre-set by an experiment or the like. To sufficiently secure, for example, the external appearance quality of the welded region of the object 60, the lower limit value of the proper range is preferably about −0.08 to −0.05, and the upper limit value of the proper range is preferably about 0.05 to 0.08.

In a case where the controller 51 determines that the tool average position Tx1 calculated in step S307 is within the proper range (No in step S308), the controller 51 returns to the start of the present flow, and initiates the next welding process.

On the other hand, in a case where the controller 51 determines that the tool average position Tx1 calculated in step S307 is outside the proper range (Yes in step S308), the controller 51 changes setting of the pressing forces and/or the rotational speeds (step S309), returns to the start of the present flow, and initiates the next welding process.

The friction stir spot welding device 50 according to Modified example 5 configured as described above can obtain advantages similar to those of the friction stir spot welding device 50 according to Embodiment 1. Except for the above-described features, the friction stir spot welding device 50 according to Modified Example 5 may be configured as in the friction stir spot welding device 50 according to any of Modified Example 1 to Modified Example 4.

[Modified Example 6]

In the friction stir spot welding device 50 according to Modified Example 6, the controller 51 inhibits the next welding process from being performed, in a case where the tool average position Tx1 is larger than a first threshold. The friction stir spot welding device according to Modified Example 6 is configured as in the friction stir spot welding device 50 according to Embodiment 1 and the constituents thereof will not be described.

[Serial Spots Welding Operation of Friction Stir Spot Welding Device]

Figure 12A:
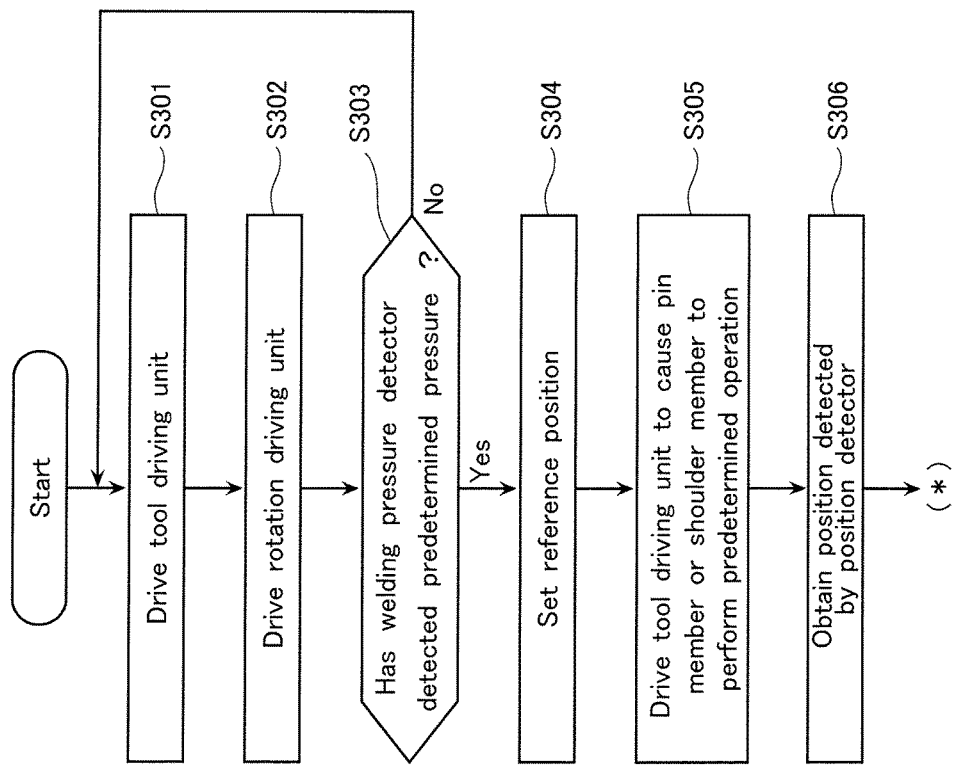
FIG. 12A is a flowchart showing the exemplary operation of a friction stir spot welding device according to Modified Example 6 of Embodiment 1 in a case where the serial spots welding is performed.
Figure 12B:
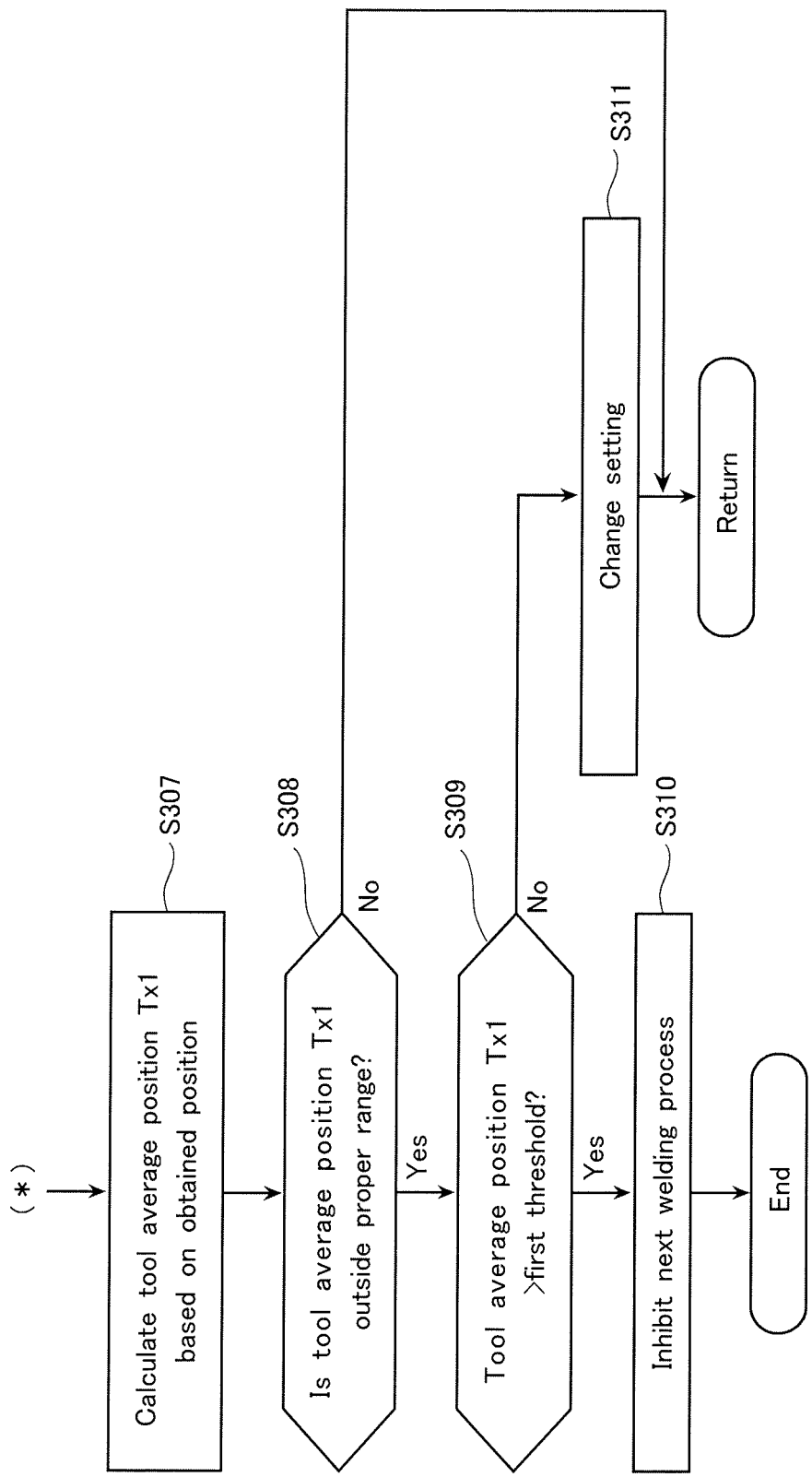
FIG. 12B is a flowchart showing the exemplary operation of a friction stir spot welding device according to Modified Example 6 of Embodiment 1 in a case where the serial spots welding is performed.

FIGS. 12A and 12B are flowcharts showing the exemplary operation of the friction stir spot welding device according to Modified Example 6 of Embodiment 1 in a case where the serial spots welding is performed.

As shown in FIGS. 12A and 12B, the serial spots welding operation performed by the friction stir spot welding device according to Modified example 6 is basically the same as that of the friction stir spot welding device 50 according to Modified Example 5 and is different in the operation performed in a case where the controller 51 determines that the tool average position Tx1 calculated in step S307 is outside the proper range (Yes in step S308). Hereinafter, the different operation will be described in detail.

In a case where the controller 51 determines that the tool average position Tx1 calculated in step S307 is outside the proper range (Yes in step S308), the controller 51 moves to step S309. In step S309, the controller 51 determines whether or not the tool average position Tx1 calculated in step S307 is larger than the first threshold.

The first threshold is larger than the proper range, and is changed depending on the metal material constituting the object 60, quality requirements, or the like. The first threshold can be pre-set by design requirements, an experiment, or the like. Depending on the required quality, the first threshold may be set to, for example, 0.1 mm or 0.2 mm. The first threshold may be set to, for example, a value that is 20% of the plate thickness of the object 60.

In a case where the controller 51 determines that the tool average position Tx1 calculated in step S307 is equal to or smaller than the first threshold (No in step S309), the controller 51 changes setting of the pressing forces and/or the rotational speeds (step S311), returns to the start of the present flow, and initiates the next welding process.

On the other hand, in a case where the controller 51 determines that the tool average position Tx1 calculated in step S307 is larger than the first threshold (Yes in step S309), the controller 51 inhibits the next welding process from being performed (step S310), and terminates the present flow. The controller 51 inhibits the next welding process from being performed, because a great amount of heat is accumulated in the pin member 11 and the shoulder member 12, and therefore, for example, there is a possibility that a good external appearance quality of the welded region of the object 60 cannot be secured well, even if setting is changed.

The phrase "inhibits the next welding process from being performed" is meant to include a case where the welding for the object 60 is ceased until a time required to sufficiently cool the pin member 11 and the shoulder member 12 passes, as well as a case where the welding for the object 60 is ceased.

The friction stir spot welding device 50 according to Modified example 6 configured as described above can obtain advantages similar to those of the friction stir spot welding device 50 according to Embodiment 1.

In addition, in the friction stir spot welding device 50 according to Modified example 6, since the controller 51 inhibits the next welding process for the object 60 from being performed, in a case where the controller 51 can determine that the pin member 11 and the shoulder member 12 are excessively heated. As a result, a good external appearance quality of the welded region of the object 60 can be secured well, and a good welding quality can be realized.

Except for the above-described features, the friction stir spot welding device 50 according to Modified Example 6 may be configured as in the friction stir spot welding device 50 according to any of Modified Example 1 to Modified Example 4.

[Embodiment 2]

In a friction stir spot welding device according to Embodiment 2, the controller determines that a portion of the object adheres to the pin member and/or the shoulder member and causes a notification unit to output an alarm, and/or inhibits the next welding process from being performed, in a case where the first position is changed between a second region that is more distant from the object than the reference position is, and the reference position or the first region, every time the welding process for the object ends. The friction stir spot welding device 50 according to Embodiment 2 is configured as in the friction stir spot welding device 50 according to Embodiment 1 and the constituents thereof will not be described.

The present inventors found that in a case where the serial spots welding for the object is performed, the first position is sometimes present within the second region at a time point when the welding process for the object ends. It is presumed that such a situation is attributed to an event in which a cavity (space) is formed between the obverse surface of the object and the tip end surface of the pin member and/or the tip end surface of the shoulder member, an event in which a portion of the object adheres to the tip end surface of the pin member and/or the tip end surface of the shoulder member, etc.

The present inventors further studied this phenomenon, and found that in a case where the first position is present within the second region, a portion of the object adhering to the tip end surface of the pin member and/or the tip end surface of the shoulder member is mixed with the welded region and removed therefrom in the next and following welding process. Thus, the present invention was conceived.

Hereinafter, the operation (control method) performed in a case where the serial spots welding is performed in the friction stir spot welding device 50 according to Embodiment 2 will be described.

[Serial Spots Welding Operation of Friction Stir Spot Welding Device]

Figure 13A:
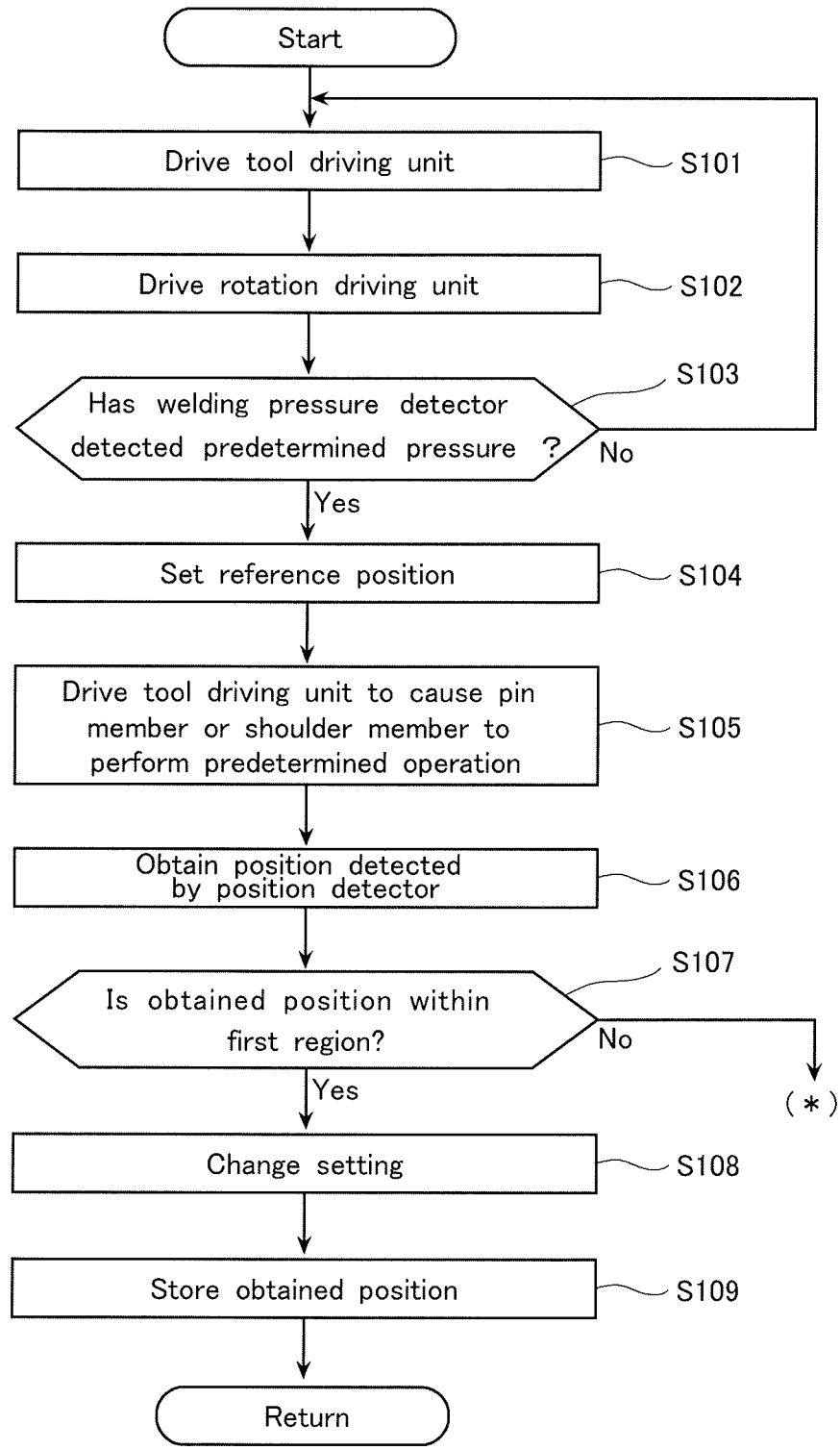
FIG. 13A is a flowchart showing the exemplary operation of a friction stir spot welding device according to Embodiment 2 in a case where the serial spots welding is performed.
Figure 13B:
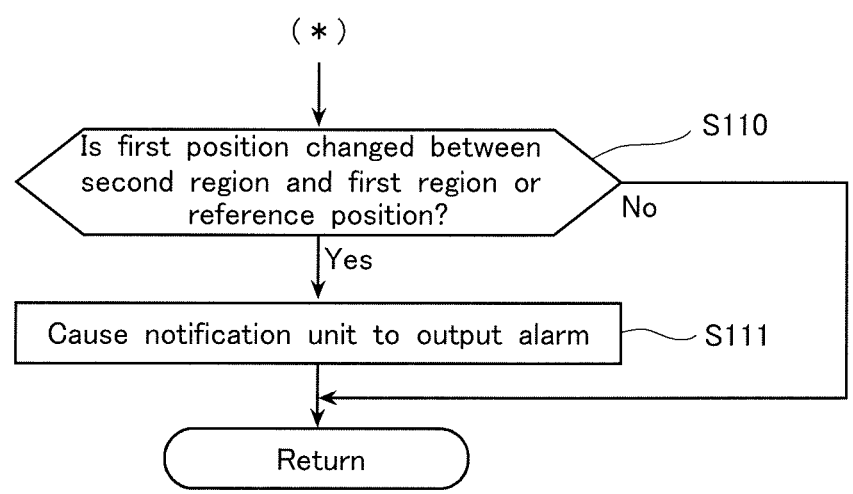
FIG. 13B is a flowchart showing the exemplary operation of a friction stir spot welding device according to Embodiment 2 in a case where the serial spots welding is performed.

FIGS. 13A and 13B are flowcharts showing the exemplary operation of the friction stir spot welding device according to Embodiment 2 in a case where the serial spots welding is performed.

As shown in FIGS. 13A and 13B, the serial spots welding operation performed by the friction stir spot welding device 50 according to Embodiment 2 is basically the same as that of the friction stir spot welding device 50 according to Embodiment 1 and are different in step S107 and the following steps. Hereinafter, the different operation will be described in detail.

In a case where the controller 51 determines that the position (first position) obtained in step S106 is within the first region (Yes in step S107), the controller 51 changes setting of the pressing forces and/or the rotational speeds (step S108). Then, the controller 51 causes the memory unit 31 to store the position (the first position) obtained in step S106 (step S109), returns to the start of the present flow, and performs the next welding process.

On the other hand, in a case where the controller 51 determines that the position obtained in step S106 is not within the first region (No in step S107), the controller 51 moves to step S110. In step S110, the controller 51 determines whether or not the first position is changed between the second region, and the first region or the reference position. Specifically, with reference to a history of the first position stored in the memory unit 31, the controller 51 determines whether or not the first position is changed between the second region, and the first region or the reference position. The history of the first position stored in the memory unit 31 is a history obtained after start of the present flow, and is not a history obtained before the start of the present flow.

A case where the first position is changed between the second region, and the first region or the reference position, every time the welding process for the object 60 ends includes the following cases.

As described above, the controller 51 causes the memory unit 31 to store the first position every time the welding process for the object 60 ends. For example, in a case where the first position in a first welding process is present within the second region, the first position in a second welding process is present within the first region (or the reference position), and the first position in a third welding process is present within the second region, the controller 51 determines that the first position is changed between the second region, and the first region or the reference position.

Note that a case where the first position is changed between the second region, and the first region or the reference position is not limited to a case where the stored first position is changed between the second region, and the first region (or the reference position), in an alternate manner. For example, a case where the first position is changed between the second region, and the first region or the reference position may be a case where the first position is present within the second region plural times in succession, then the first position is present within the first region (or the reference position) at least once, and then the first position is present within the second region, or a case where the first position is present within the first region (or the reference position) plural times in succession, then the first position is present within the second region at least once, and then the first position is present within the first region (or the reference position).

In a case where the controller 51 determines that the first position is not changed between the second region, and the first region or the reference position (No in step S110), the controller 51 returns to the start of the present flow, and initiates the next welding process.

On the other hand, in a case where the controller 51 determines that the first position is changed between the second region, and the first region or the reference position (Yes in step S110), the controller 51 causes the notification unit to output an alarm indicating that there is a possibility that a portion of the object adheres to the tip end surface of the pin member 11 and/or the tip end surface of the shoulder member 12 (step S111), returns to the start of the present flow, and performs the next welding process.

The notification unit may be configured in any way so long as the notification unit can notify a user of the alarm. The notification unit may notify the user of the alarm by displaying text data, image data or the like on a display section (screen) of a remote controller, by a sound (voice) emitted from a speaker or the like, or by light or color. Further, the notification unit may notify the user of the alarm by a mail or an application to a smart phone, a cellular phone, a tablet-type computer, etc., via a communication network.

The user of the friction stir spot welding device 50 can know that there is a possibility that an abnormality has occurred in the pin member 11 and/or the shoulder member 12. This leads to earlier maintenance or the like of the friction stir spot welding device 50. Therefore, it becomes possible to prevent a situation in which a portion of the object 60 adhering to the pin member 11 is mixed with the welded region (e.g., the obverse surface 60c of the object 60 is overlaid).

Although in Embodiment 2, the controller 51 causes the notification unit to output the alarm in a case where the first position is changed between the second region and the first region or the reference position, this is merely exemplary. For example, the controller 51 may inhibit the next welding process in a case where the first position is changed between the second region and the first region or the reference position. Further, the controller 51 may cause the notification unit to output the alarm plural times, and then inhibit the next welding process in a case where the first position is changed between the second region and the first region or the reference position.

Except for the above-described features, the friction stir spot welding device 50 according to Embodiment 2 may be configured as in the friction stir spot welding device 50 according to any of Modified Example 1 to Modified Example 6 of Embodiment 1.

[Modified Example 1]

Next, Modified Examples of the friction stir spot welding device 50 according to Embodiment 2 will be described.

In the friction stir spot welding device according to Modified Example 1, the controller determines that a portion of the object adheres to the pin member and/or the shoulder member, and causes the notification unit to output an alarm, and/or inhibits the next welding process from being performed, in a case where the tool average position Tx1 is changed between a minus value and a plus value or 0, every time the welding process for the object ends. The friction stir spot welding device 50 according to Modified Example 1 of Embodiment 2 is configured as in the friction stir spot welding device 50 according to Embodiment 1 and the constituents thereof will not be described.

[Serial Spots Welding Operation of Friction Stir Spot Welding Device]

Figure 14A:
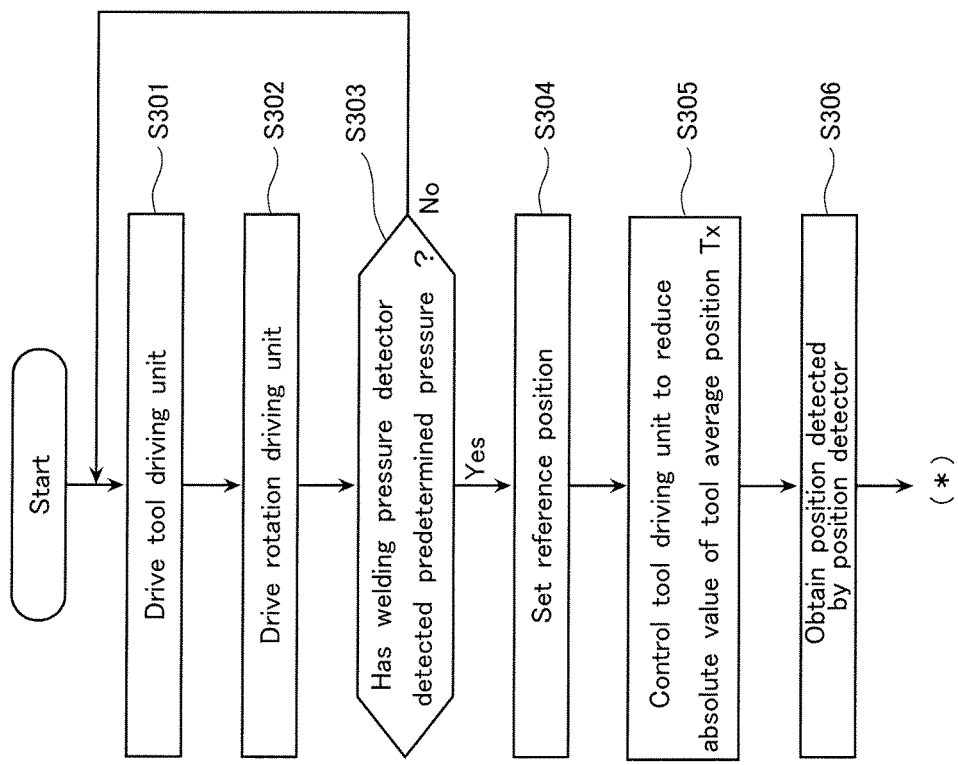
FIG. 14A is a flowchart showing the exemplary operation of a friction stir spot welding device according to Modified example 1 of Embodiment 2 in a case where the serial spots welding is performed.
Figure 14B:
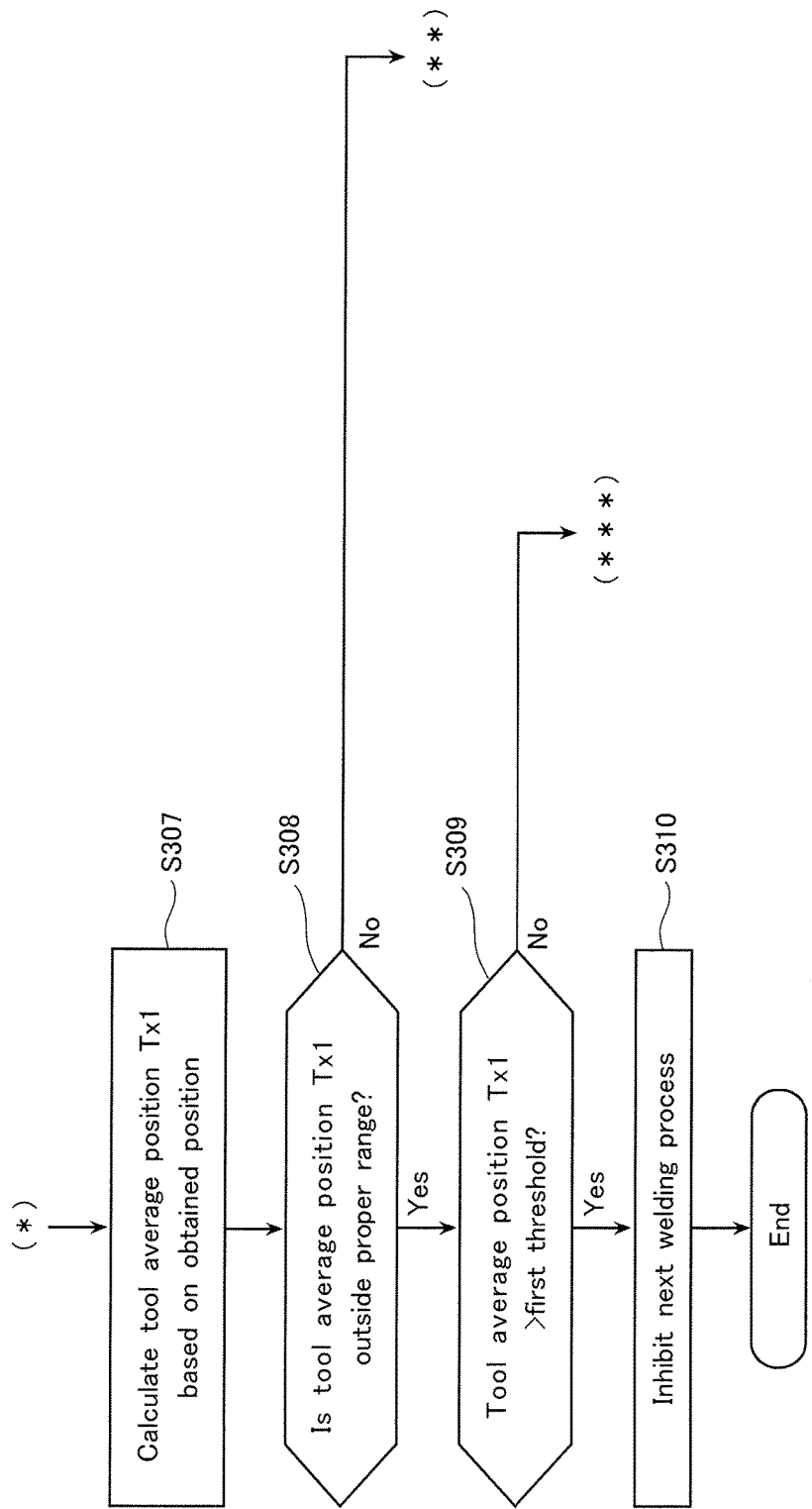
FIG. 14B is a flowchart showing the exemplary operation of the friction stir spot welding device according to Modified example 1 of Embodiment 2 in a case where the serial spots welding is performed.
Figure 14C:
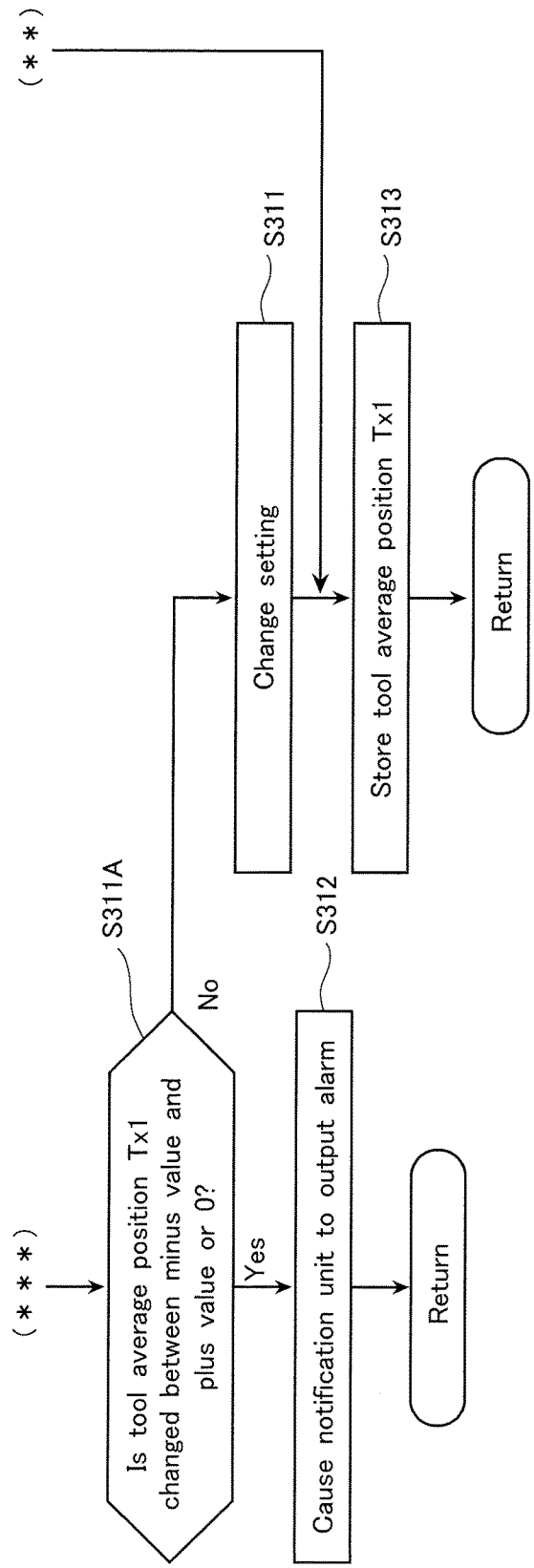
FIG. 14C is a flowchart showing the exemplary operation of the friction stir spot welding device according to Modified example 1 of Embodiment 2 in a case where the serial spots welding is performed.

FIGS. 14A to 14C are flowcharts showing the exemplary operation of the friction stir spot welding device according to Modified Example 1 of Embodiment 2 in a case where the serial spots welding is performed.

As shown in FIGS. 14A to 14C, the serial spots welding operation performed by the friction stir spot welding device 50 according to Modified Example 1 of Embodiment 2 is basically the same as that of the friction stir spot welding device 50 according to Modified Example 5 of Embodiment 1 and is different in step S308 and the following steps. Hereinafter, the different operation will be described in detail.

In a case where the controller 51 determines that the tool average position Tx1 calculated in step S307 is within a proper range (No in step S308), the controller 51 causes the memory unit 31 to store the tool average position Tx1 calculated in step S307 (step S313), returns to the start of the present flow, and performs the next welding process.

On the other hand, in a case where the controller 51 determines that the tool average position Tx1 calculated in step S307 is outside the proper range (Yes in step S308), the controller 51 moves to step S309. In step S309, the controller 51 determines whether or not the tool average position Tx1 calculated in step S307 is larger than the first threshold.

In a case where the controller 51 determines that the tool average position Tx1 calculated in step S307 is larger than the first threshold (Yes in step S309), the controller 51 inhibits the next welding process from being performed (step S312), and terminates the present flow.

On the other hand, in a case where the controller 51 determines that the tool average position Tx1 calculated in step S307 is equal to or smaller than the first threshold (No in step S309), the controller 51 determines whether or not the tool average position Tx1 is changed between a minus value and a plus value or 0 (step S311A).

Specifically, the controller 51 determines whether or not the tool average position Tx1 is changed between the minus value and the plus value or 0, with reference to a history of the tool average position Tx1 stored in the memory unit 31. Note that the history of the tool average position Tx1 stored in the memory unit 31 is a history obtained after start of the present flow, and is not a history obtained before the start of the present flow.

A case where the tool average position Tx1 is changed between the minus value and the plus value or 0, every time the welding process for the object ends includes the following cases.

As described above, the controller 51 causes the memory unit 31 to store the tool average position Tx1 every time the welding process for the object 60 ends. For example, in a case where the tool average position Tx1 in a first welding process takes the minus value, the tool average position Tx1 in a second welding process takes the plus value (or 0), and the tool average position Tx1 in a third welding process takes the minus value, the controller 51 determines that the stored tool average position Tx1 is changed between the minus value and the plus value or 0.

The case where the tool average position Tx1 is changed between the minus value and the plus value or 0 is not limited to a case the stored tool average position Tx1 is changed between the minus value and the plus value or 0 in an alternate manner. For example, the case where the tool average position Tx1 is changed between the minus value and the plus value or 0 may be a case where the tool average position Tx1 takes the minus value plural times in succession, then the tool average position Tx1 takes the plus value (or 0) at least once, and then the tool average position Tx1 takes the minus value, or a case where the tool average position Tx1 takes the plus value (or 0) plural times in succession, then the tool average position Tx1 takes the minus value at least once, and then the tool average position Tx1 takes the plus value (or 0).

In a case where the controller 51 determines that the tool average position Tx1 is changed between the minus value and the plus value or 0 (Yes in step S311A), the controller 51 causes the notification unit to output an alarm indicating that there is a possibility that a portion of the object 60 adheres to the tip end surface of the pin member 11 and/or the tip end surface of the shoulder member 12 to notify the user of the abnormality (step S312), returns to the start of the present flow, and performs the next welding process.

On the other hand, in a case where the controller 51 determines that the tool average position Tx1 is not changed between the minus value and the plus value or 0 (No in step S311A), the controller 51 changes setting of the pressing forces and/or the rotational speeds (step S311). Then, the controller 51 causes the memory unit 31 to store the tool average position Tx1 calculated in step S307 (step S313), returns to the start of the present flow, and initiates the next welding process.

The friction stir spot welding device 50 according to Modified Example 1 configured as described above can obtain advantages similar to those of the friction stir spot welding device 50 according to Embodiment 2.

Although in Modified Example 1, in a case where the controller 51 determines that the first position is changed between the second region and the first region or the reference position, the controller 51 causes the notification unit to output the alarm, this is merely exemplary. For example, in a case where the controller 51 determines that the first position is changed between the second region and the first region or the reference position, the controller 51 may inhibit the next welding process from being performed. Further, in a case where the controller 51 determines that the first position is changed between the second region and the first region or the reference position, the controller 51 causes the notification unit to output the alarm plural times, and then inhibit the next welding process from being performed.

Except for the above-described features, the friction stir spot welding device 50 according to Modified Example 1 of Embodiment 2 may be configured as in the friction stir spot welding device 50 according to any of Modified Example 1 to Modified Example 6 of Embodiment 1.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

A friction stir spot welding device and a friction stir spot welding method of the present invention are useful in that a good welding quality can be realized even when serial spots welding is performed.

REFERENCE SIGNS LIST 11 pin member
11a tip end surface
12 shoulder member
12a tip end surface
21 position detector
31 memory unit
32 input unit
33 welding pressure detector
41 clamp driving unit
50 friction stir spot welding device
51 controller
52 tool fixing unit
53 tool driving unit
54 clamp member
54a tip end surface
55 backing support section
56 backing member
56a support surface
57 rotation driving unit
60 object
60a plasticized (plastic flow) region
60b welded region
60c obverse surface
60d reverse surface
61 metal plate
62 metal plate
521 rotational tool fixing unit
522 clamp fixing unit
531 pin driving unit
532 shoulder driving unit

The invention claimed is:

1. A friction stir spot welding device which welds an object to be welded, by softening the object by friction heat and by stirring the object, the friction stir spot welding device comprising:
a pin member which has a solid cylinder shape, is rotatable around an axis of the pin member, and is advanceable and retractable along the axis of the pin member;
a shoulder member which has a tubular shape with a circular cross-section, is rotatable around an axis of the shoulder member, and is advanceable and retractable along the axis of shoulder member, the pin member being insertable into the shoulder member;
a rotation driving unit which rotates the pin member around the axis of the pin member and rotates the shoulder member around the axis of the shoulder member;
a tool driving unit which causes the pin member to be advanced and retracted along the axis of the pin member, and causes the shoulder member to be advanced and retracted along the axis of the shoulder member;
a position detector which detects an axial position of a tip end surface of the pin member or an axial position of a tip end surface of the shoulder member; and
a controller including a CPU and a memory, the processor being configured to read a program stored in the memory and execute the program so as to
set as a reference position the axial position of the tip end surface of the pin member or the axial position of the tip end surface of the shoulder member which is detected by the position detector at a time point when the tip end surface of the pin member or the tip end surface of the shoulder member contacts an obverse surface of the object, when a welding process for the object is initiated,
control the tool driving unit to make the tip end surface of the pin member and the tip end surface of the shoulder member coplanar with each other, when the welding process for the object ends,
control the tool driving unit to reduce a pressing force applied to the object by the pin member and a pressing force applied to the object by the shoulder member in a next welding process, and/ or control the rotation driving unit to reduce a rotational speed of the pin member and a rotational speed of the shoulder member in the next welding process, in a case where a first position which is the axial position of the tip end surface of the pin member or the axial position of the tip end surface of the shoulder member, which is detected by the position detector, is within a first region which is inward of the object relative to the reference position, when the welding process for the object ends.

2. The friction stir spot welding device according to claim 1,
wherein the controller controls the tool driving unit to reduce the pressing force applied to the object by the pin member and the pressing force applied to the object by the shoulder member in the next welding process, and/or controls the rotation driving unit to reduce the rotational speed of the pin member and the rotational speed of the shoulder member in the next welding process, in a case where the first position is within the first region when the welding process for the object ends, and a temperature of the pin member and a temperature of the shoulder member are equal to or higher than a predetermined temperature, when the next welding process is initiated.

3. The friction stir spot welding device according to claim 1,
wherein the controller controls the tool driving unit to reduce the pressing force applied to the object by the pin member and the pressing force applied to the object by the shoulder member in the next welding process, and/or controls the rotation driving unit to reduce the rotational speed of the pin member and the rotational speed of the shoulder member in the next welding process, in a case where the first position is within the first region when the welding process for the object ends, and a time that passes from when the welding process for the object has ended until the next welding process is initiated is within a predetermined time.

4. The friction stir spot welding device according to claim 1,
wherein the controller determines that a portion of the object adheres to the pin member and/or the shoulder member, causes a notification unit to output an alarm, and/or inhibits the next welding process from being performed, in a case where the first position is changed between a second region that is more distant from the object than the reference position is, and the first region or the reference position, every time the welding process for the object ends.

5. The friction stir spot welding device according to claim 1,
wherein the controller controls the tool driving unit so that an absolute value of a tool average position Tx defined in a formula $Ap \cdot Pp + As \cdot Ps = Tx$ is reduced, in a case where a cross-sectional area of the tip end surface of the pin member is designated by Ap, a cross-sectional area of the tip end surface of the shoulder member is designated by As, a plunge depth of the pin member plunged into the obverse surface of the object is designated by Pp, and a plunge depth of the shoulder member plunged into the obverse surface of the object is designated by Ps.

6. The friction stir spot welding device according to claim 5,
wherein the controller controls the tool driving unit to realize that the tool average position Tx is equal to 0.

7. The friction stir spot welding device according to claim 5,
wherein the controller controls the tool driving unit to reduce the pressing force applied to the object by the pin member and the pressing force applied to the object by the shoulder member in the next welding process and/or controls the rotation driving unit to reduce the rotational speed of the pin member and the rotational speed of the shoulder member in the next welding process, in a case where a tool average position Tx1 which is the tool average position Tx calculated based on the reference position and the first position is outside a preset proper range.

8. The friction stir spot welding device according to claim 7,
wherein the controller inhibits the next welding process from being performed, in a case where the tool average position Tx1 is larger than a first threshold which is larger than the preset proper range.

9. The friction stir spot welding device according to claim 7,
wherein the controller determines that a portion of the object adheres to the pin member and/or the shoulder member, causes the notification unit to output an alarm, and/or inhibits the next welding process from being performed, in a case where the tool average position Tx1 is changed between a minus value and a plus value or 0, every time the welding process for the object ends.

10. The friction stir spot welding device according to claim 1, further comprising:
a clamp member which is advanceable and retractable along an axis of the clamp member; and
a clamp member driving unit which causes the clamp member to be advanced and retracted along the axis of the clamp member,
wherein the controller controls the tool driving unit and/or the clamp member driving unit to reduce the pressing force applied to the object by the pin member, the pressing force applied to the object by the shoulder member, and a pressing force applied to the object by the clamp member in the next welding process, in a case where the first position is within the first region.

11. A friction stir spot welding method which welds an object to be welded, by softening the object by friction heat and by stirring the object, the friction stir spot welding method comprising:
(A) setting as a reference position an axial position of a tip end surface of a pin member or an axial position of a tip end surface of a shoulder member which is detected by a position detector at a time point when the tip end surface of the pin member or the tip end surface of the shoulder member contacts an obverse surface of the object, wherein the pin member has a solid cylinder shape, is rotatable around an axis of the pin member, and is advanceable and retractable along the axis of the pin member, and the shoulder member is disposed to surround an outer peripheral surface of the pin member, has a tubular shape with a circular cross-section, is rotatable around an axis of the shoulder member, and is advanceable and retractable along the axis of the shoulder member;
(B) causing a tool driving unit to advance and retract the pin member or the shoulder member along the axis of the pin member or the axis of the shoulder member, in a state in which the object is pressed by a preset pressing force applied by the pin member or the shoulder member, and causing a rotation driving unit to rotate the pin member or the shoulder member at a preset rotational speed, to partially stir the object and weld the object;
(C) driving the tool driving unit to make the tip end surface of the pin member and the tip end surface of the shoulder member coplanar with each other, when the welding process for the object ends,
(D) detecting a first position by the position detector, the first position being an axial position of the tip end surface of the pin member or an axial position of the tip end surface of the shoulder member, after (C); and
(E) changing setting to reduce a pressing force applied to the object by the pin member and a pressing force applied to the object by the shoulder member in a next welding process, and/or to reduce a rotational speed of the pin member and a rotational speed of the shoulder member in the next welding process, in a case where the first position is within a first region that is inward of the object relative to the reference position.

12. The friction stir spot welding method according to claim 11,
wherein in (E), the setting in the next welding process is changed, in a case where the first position is within the first region and a temperature of the pin member and a temperature of the shoulder member are equal to or higher than a predetermined temperature, when the next welding process is initiated.

13. The friction stir spot welding method according to claim 11,
wherein in (E), the setting in the next welding process is changed, in a case where the first position is within the first region, and a time that passes from (D) until the next welding process is initiated is within a predetermined time.

14. The friction stir spot welding method according to claim 11, further comprising:
(F) determining that a portion of the object adheres to the pin member and/or the shoulder member, in a case where the first position detected in (D) is changed between a second region that is more distant from the object than the reference position is, and the first region or the reference position, every time the welding process for the object ends; and
(G) causing a notification unit to output an alarm and/or inhibit the next welding process from being performed, in a case where it is determined that a portion of the object adheres to the pin member and/or the shoulder member in (F).

15. The friction stir spot welding method according to claim 11,
wherein in the setting of (B), an operation amount of the tool driving unit is set to reduce an absolute value of a tool average position Tx defined in a formula $Ap \cdot Pp + As \cdot Ps = Tx$, in a case where a cross-sectional area of the tip end surface of the pin member is designated by $Ap$, a cross-sectional area of the tip end surface of the shoulder member is designated by $As$, a plunge depth of the pin member plunged into the obverse surface of the object is designated by $Pp$, and a plunge depth of the shoulder member plunged into the obverse surface of the object is designated by $Ps$.

16. The friction stir spot welding method according to claim 15,
wherein in the setting of (B), the operation amount of the tool driving unit is set to realize that the tool average position is equal to 0.

17. The friction stir spot welding method according to claim 16,
wherein in (E), the setting is changed to reduce the pressing force applied to the object by the pin member and the pressing force applied to the object by the shoulder member in the next welding process and/or to reduce the rotational speed of the pin member and the rotational speed of the shoulder member in the next welding process, in a case where a tool average position $Tx1$ which is the tool average position $Tx$ calculated based on the reference position and the first position is outside a preset proper range.

18. The friction stir spot welding method according to claim 17, further comprising:
(H) inhibiting the next welding process from being performed, in a case where the tool average position $Tx1$ is larger than a first threshold which is larger than the preset proper range, in (E).

19. The friction stir spot welding method according to claim 17,
wherein in (F), it is determined that a portion of the object adheres to the pin member and/or the shoulder member, in a case where the tool average position $Tx1$ is changed between a minus value and a plus value or 0, every time the welding process for the object ends.

20. The friction stir spot welding method according to claim 11,
wherein in (B), the tool driving unit causes the pin member or the shoulder member to be advanced and retracted along the axis of the pin member or the axis of the shoulder member, and the rotation driving unit causes the pin member or the shoulder member to be rotated at the preset rotational speed, to partially stir the object and weld the object, in a state in which the object is pressed by a preset pressing force applied by at least one of the pin member and the shoulder member, and the clamp member and
wherein in (E), the setting is changed to reduce the pressing force applied to the object by at least one of the pin member and the shoulder member, and the clamp member, in the next welding process, in a case where the first position is within the first region.

\* \* \* \* \*